United States Patent [19]
Takebe

[11] Patent Number: 5,502,822
[45] Date of Patent: Mar. 26, 1996

[54] ASYNCHRONOUS DATA TRANSMISSION SYSTEM

[75] Inventor: Makoto Takebe, Kanagawa, Japan

[73] Assignee: Kabushiki Kaisha Komatsu Seisakusho, Tokyo, Japan

[21] Appl. No.: 938,037

[22] PCT Filed: May 14, 1991

[86] PCT No.: PCT/JP91/00632

§ 371 Date: Nov. 12, 1992

§ 102(e) Date: Nov. 12, 1992

[87] PCT Pub. No.: WO91/18346

PCT Pub. Date: Nov. 28, 1991

[30] Foreign Application Priority Data

May 14, 1990 [JP] Japan ................... 2-123461

[51] Int. Cl.⁶ .................................... G06F 13/38
[52] U.S. Cl. ................... 395/310; 395/250; 395/873
[58] Field of Search .......................... 395/325, 250, 395/425, 275, 873, 872, 310; 370/60, 94.1

[56] References Cited

U.S. PATENT DOCUMENTS

| | | | |
|---|---|---|---|
| 4,298,954 | 11/1981 | Bigelow et al. | 395/250 |
| 5,079,762 | 1/1992 | Tanabe | 370/60 |
| 5,083,269 | 1/1992 | Syobatake et al. | 395/425 |
| 5,126,999 | 6/1992 | Munter et al. | 370/60 |
| 5,130,975 | 7/1992 | Akata | 370/60 |
| 5,163,132 | 11/1992 | DuLac et al. | 395/873 |

FOREIGN PATENT DOCUMENTS 61-233857 10/1986 Japan ................. G06F 13/38

OTHER PUBLICATIONS

Japanese Laid-Open Patent Publication No. 64-36363.
Japanese Laid-Open Patent Publication No. 63-81557.
Japanese Laid-Open Patent Publication No. 61-233857.
Japanese Laid-Open Patent Publication No. 59-144929.
Japanese Laid-Open Patent Publication No. 2-153453.
Japanese Laid-Open Patent Publication No. 2-153454.
Japanese Laid-Open Patent Publication No. 2-153455.
International Search Report.
Preliminary Examination Report.

*Primary Examiner*—Glenn A. Auve
*Attorney, Agent, or Firm*—Baker & Daniels

[57] ABSTRACT

An asynchronous data transmission system for asynchronously transmitting data from a first system controller to a second system controller in which a memory for holding therein data to be transmitted has a duplex structure including first and second memories, output data of the first system controller is alternately written into the first and second memories in response to the data transmission of the first system controller, the reading operation of the second system controller is carried out over one of the memories over which the writing operation of the first system controller has been completed, the next writing operation of the first system controller is carried out over the other one of the memories.

13 Claims, 23 Drawing Sheets

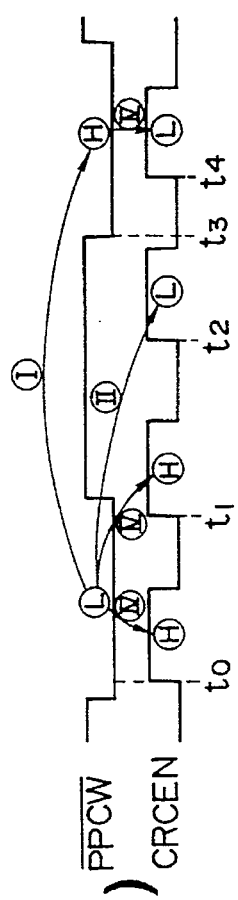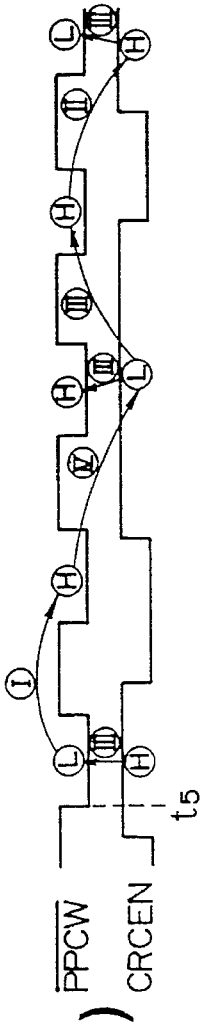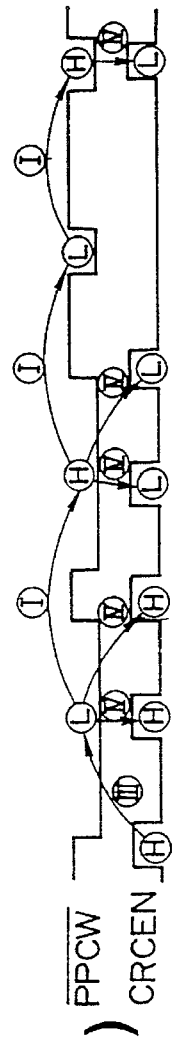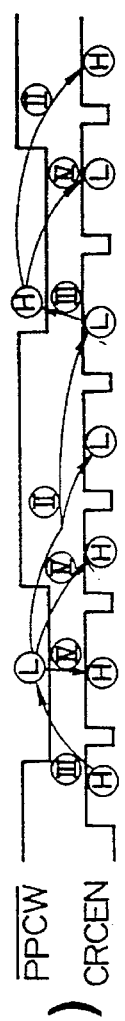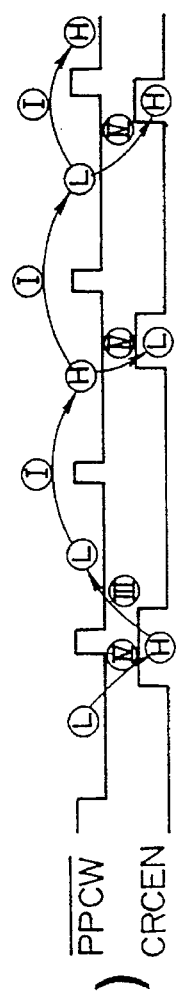

ASYNCHRONOUS DATA TRANSMISSION SYSTEM

TECHNICAL FIELD

The present invention relates to an asynchronous data transmission system which can suitably realize intermittent asynchronous transmission of continual data between two system controllers or in a star or tree type network.

BACKGROUND ART

For data transmission between two system controllers, a buffer device for providing hardware synchronism and speed adjustment is usually provided between these controllers.

In a prior art data transmission system, such a buffer device as mentioned above is provided in single so that access from one controller has a preference over access from the other to avoid access collision.

With such a prior art arrangement, however, in the case where data transmission is intended from a system controller A to a system controller B and a write request from the controller A is set to have a preference over a read request from the controller B for example, there occurs such a problem that the write request during the reading operation causes different data before and after the reading, which results in that the controller B cannot handle the data of the controller A at the same time and having the contents as the controller B.

Even in the case where a dual port memory is used, this is a big problem when a package of data is transmitted from the system controller A to the system controller B, that is, accurate data transmission cannot be achieved.

In this type of data transmission, the system controllers A and B usually use mutually different system clocks. For this reason, a write request from the controller A and a read request from the controller B may be generated exactly simultaneously in synchronism with the different system clocks, in which case the write and read requests to the same memory collide with each other.

In view of the such circumstances, it is an object of the present invention to provide an asynchronous data transmission system which can accurately and reliably transmit a large quantity of data in the form of a single package between system controllers without any handshake.

Another object of the present invention is to provide an asynchronous data transmission system which can realize accurate and reliable data transmission between two system controllers having different system clocks.

DISCLOSURE OF THE INVENTION

In accordance with a first invention, there is provided an asynchronous data transmission system for asynchronously transmitting data from a first system controller to a second system controller, which comprises: first and second memories for writing therein output data of the first system controller and for reading out therefrom the written data to the second system controller; and control means, in response to data transmission of the first system controller to the second system controller, for alternately writing the output data of the first system controller into the first and second memories, for selecting one of the first and second memories in which the data is written immediately previously when the second system controller receives the data and, for reading out the data from the selected memory, in which the control means, at the time of performing the writing operation, if the second system controller is performing reading operation over one of the first and second memories, writes the output data of the first system controller into the other one of the memories opposite to the one of the memories over which the reading operation is carried out, while at the time of performing the reading operation, if the first system controller is performing writing operation over one of the first and second memories, reads the data from the other one of the memories opposite to the one of the memories over which the writing operation is carried out.

In the first invention, a memory for holding therein data to be transmitted is arranged to have a duplex structure including first and second memories. The control means, in response to the data transmitting operation of the first system controller and the data receiving operation of the second system controller, selects one of the memories to be accessed according to the following logic.

In response to the data transmission of the first system controller, the output data of the first system controller is alternately written in the first and second memories. When the second system controller performs its data receiving operation, the data is read out from one of the first and second memories in which the data was written immediately previously. That is, when the first system controller completes the writing operation, the second system controller performs its reading operation over the memory over which the writing operation has been completed and the next writing operation of the first system controller is carried out over the other memory.

At the time of performing the writing operation, if the second system controller is performing its reading operation over one of the first and second memories, the output data of the first system controller is written into the other memory opposite to the one over which the reading operation is carried out.

At the time of performing the reading operation, if the first system controller is performing the writing operation over one of the first and second memories, the reading operation is carried out from the other memory opposite to the one over which the writing operation is carried out.

In this way, in accordance with the first invention, in the data transmission between the two system controllers, it can be avoided that accessing operation of one system controller is temporarily awaited and data is interrupted by the accessing operation of one system controller during the accessing operation of the other system controller, whereby accurate data transmission can be realized at a high speed without any errors.

In accordance with a second invention, there is provided an asynchronous data transmission system for transmitting data from a first system controller to a second system controller having an access time shorter than a non-access time of the first system controller, which comprises: a first readable/writable memory for temporarily storing therein the data outputted from the first system controller; a second memory for writing therein the output data of the first system controller or data temporarily stored in the first memory and for reading out the written data therefrom to the second system controller; a third memory provided in parallel to the second memory for writing therein the output data of the first system controller or the data temporarily stored in the first memory and for reading out therefrom the written data to the second system controller; write control means for performing first write control of simultaneously writing the output data of the first system controller both into one of the second and third memories and into the first memory in response to one write period of the first system controller and for performing, after completion of the first write control, second write control of writing the data written in the first memory into the other memory opposite to the one of the second and third memories in which the output data of the first system controller is written in the first write control; and read control means for reading out the data from either one of the second and third memories and for outputting the read-out data to the second system controller in response to one read period of the second system controller.

In the second invention, the memory for holding therein data to be transmitted is arranged to have a duplex structure (having second and third memories), the first memory is provided between the first system controller for data transmission and the second and third memories so that, when it is desired to write data from the first system controller into the second and third memories, the writing operation is carried out two times at different time points. More specifically, in the first-time writing operation, the data is written both into either one of the second and third memories and into the first memory; in the second-time writing operation, the data of the first memory is written into one of the second and third memories in which the data was not written in the first-time writing operation, whereby the same data is written into the second and third memories. When it is desired to read out the data from the second and third memories, in response to a read request of the second system controller, data reading operation is carried out over one of the second and third memories over which the writing operation is not being carried out.

In this way, in accordance with the second invention, in the data transmission between the system controllers having different memory access periods, the duplex memory is provided between these data transmission paths so that, when it is desired to write data from one of the system controllers to the memories, the writing operation is carried out two times at different time points, while when read accessing is desired from the other system controller to the memories, the data is read out from one of the memories which is not used. As a result, it is eliminated that data is interrupted during the access period of the system controllers, with the result that the receiver system controller can receive the data of the same time and the same contents as the data of the sender system controller and thus accurate data transmission can be realized without any errors.

In accordance with a third invention, there is provided an asynchronous data transmission system for transmitting data from a first system controller to a second system controller having an access time shorter than a non-access time of the first system controller in which different system clocks are used for the first and second system controllers, which comprises: a first readable/writable memory for temporarily storing therein the data outputted from the first system controller; second and third memories having a parallel structure for previously setting therein predetermined access priorities of the first and second system controllers thereto, for writing therein the output data of the first system controller or the data temporary storage in the first memory, and for reading out the written data therefrom to the second system controller; first judgment means, at the time of starting a write request from the first system controller, for judging at least three times at different time points an access state of the second system controller to the second and third memories to obtain at least three judgment results; majority decision means for performing majority decision between the judgment results of the first judgment means; first selection means for selecting one of the second and third memories which the second system controller is not accessing on the basis of an output of the majority decision means and the priorities; first write means, in response to the write request from the first system controller, for performing first write control of simultaneously writing the output data of the first system controller both into the memory corresponding to a selection result of the first selection means and into the first memory; second judgment means for judging at least two times at different time points the access state of the second system controller to the second and third memories in response to completion of the first write control; second write means for performing second write control of writing the storage data of the first memory into the other memory which is not selected by the first selection means in response to a judgment result of the second judgment means; third judgment means for judging the write access state from the first system controller or the first memory to the second and third memories at the time of starting a read request from the second system controlling second selection means for selecting one of the second and third memories which the first system controller is not accessing on the basis of an output of the third judgment means and the priorities; and read means, in response to the read request from the second system controller, for reading out the storage data from the memory corresponding to a selection result of the second selection means and for outputting the read-out data to the second system controller.

In the third invention, a memory for holding therein data to be transmitted is arranged to have a duplex structure (second and third memories) and the first memory is provided between the first system controller which transmits the data and the second and third memories so that, when it is desired for the first system controller to perform the data writing operation over the second and third memories, the writing operation is carried out two times at different time points (first and second write controls).

In the first-time writing operation, the access state of the second system controller to the second and third memories is judged at least three times at different time points, majority decision is made between these judgment results to select one of the second and third memories which the second system controller is not accessing, and the data is written both into the selected memory and the first memory. In the second-time writing operation, the access state of the second system controller to the third memory at the time of the completion of the first-time writing operation is judged at least two times at different time points, and at the time of finding a coincidence between these judgment results, the data of the first memory is written into the other of the second and third memories which is not accessed in the first-time writing operation. In this way, the same data is written in the second and third memories.

At the time of reading out the data from these second and third memories, the write access state from the first system controller or the first memory to the second and third memories is judged in response to the read request of the second system controller, one of the second and third memories being not accessed by the first system controller is selected on the basis of the judgment result to read out the data from the selected memory.

In this way, in accordance with the third invention, in the data transmission between the system controllers having different memory access periods and using different system clocks, access collision to the same memory zone can be suitably avoided, which results in that the data can be prevented from being interrupted during the access periods of the system controllers, whereby the receiver system controller can receive the data of the same time and the same contents as the sender system controller and accurate data transmission can be realized without any errors.

In accordance with a fourth invention, there is provided an asynchronous data transmission system for transmitting data from a first system controller to a second system controller having an access time longer than a non-access time of the first system controller, which comprises a first memory for writing therein the output data of the first system controller and for reading out the written data therefrom to the second system controller; a second memory provided in parallel to the first memory for writing therein the output data of the first system controller and for reading out the written data therefrom to the second system controller; buffer means for performing buffering operation of writing the storage data of one of the first and second memories into the other of the first and second memories; write control means for performing first-time write control of writing the output data of the first system controller into one of the first and second memories in response to a data transmission request of the first system controller and for performing, after completion of the first-time write control, second-time write control of reading out the data written in the first-time write control and writing the read-out data into the other memory opposite to the one of the first and second memories in which the data is written in the first-time write control; and read control means for reading out the data from either one of the first and second memories and for outputting the read-out data to the second system controller in response to a read request of the second system controller.

In the fourth invention, predetermined priorities of the first and second memories are previously set for accesses from the first and second system controllers. And the write control means includes first judgment means for judging an access state of the second system controller to the first and second memories at the time of completing the first-time write control and for judging whether the second-time write control is started or awaited; first write means, when the first judgment means outputs a judgment result of the start of the second-time write control, for executing the second-time write control; first wait means, when the first judgment means outputs a wait judgment result, for waiting for the second-time writing operation until the access of the second system controller is completed; second judgment means for judging the access state of the second system controller to the first and second memories and the output of the first judgment means at the time of starting the transfer request from the first system controller; second write means, when the second judgment means outputs a judgment result that the second system controller is in its non-access state, for performing the first-time write control by selecting one of the first and second memories which is higher in the priorities; third write means, when the second judgment means outputs a judgment result of waiting for the second-time write control, for canceling the second-time write control and performing the first-time write control over one of the first and second memories which the second system controller is not accessing; and second wait means, when the second judgment means outputs a judgment result that the second-time write control is being executed, for making to wait for the first-time write control until completion of the second-time write control. Further, the read control means includes: third judgment means for judging states of the first-time and second-time write controls at the time of starting the read request from the second system controller; and read means, on the basis of an output of the third judgment means and the priorities, when the first system controller is in the non-access state, for reading out the storage data from one of the first and second memories which is higher in the priorities, when the first-time write control is being carried out, reading out the storage data from one of the first and second memories over which the first-time write control is not carried out and, when the second-time write control is being carried out, reading out the storage data from one of the first and second memories over which the reading operation is carried out in the second-time write control, and for outputting the read-out data to the second system controller.

In the fourth invention, the memory for holding therein data to be transmitted has a duplex structure (having the first and second memories), the buffer means comprising, e.g., a multiplicity of flip-flops is provided between the first system controller as the data sender and the first and second memories, so that, when it is desired to write data from the first system controller to the first and second memories, the writing operation is carried out two times at different time points. More specifically, the data is written into either one of the first and second memories in the first-time writing operation and one of the first and second memories in which the data is not written in the first-time writing operation is put in its writable state and the other memory is put in its readable state in the second-time writing operation, so that, when memory-to-memory transmission is carried out to transmit the data written in the first-time writing operation through the buffer means from one memory to the other, the same data is written in the first and second memories.

When it is desired to read out the data from the first and second memories, in response to the read request of the second system controller, the data is read out from one of the first and second memories over which the writing operation is not being carried out.

With such an arrangement as mentioned above, at the time of starting the second-time writing operation, if the second system controller is accessing the memory in which the data is to be written, the second-time writing operation is awaited until the access of the second system controller is completed, after which the second-time writing operation is started (the second-time writing operation awaited). Further, when the second-time writing operation is being carried out at the time of receiving the data transmission request from the first system controller, the first-time writing operation is awaited until the second-time writing operation is completed, after which the first-time writing operation is started (the first-time writing operation awaited).

When the second-time writing operation is in its wait state at the time of receiving the data transmission request from the first system controller, that is, if the second system controller is accessing to the memory to be subjected to the second-time writing operation, the second-time writing operation in the wait state is canceled and the next first-time writing operation is performed over the zone not accessed by the second system controller (the second-time writing operation skipped).

In this way, in accordance with the fourth invention, in the asynchronous data transmission system for transmitting data from the first system controller to the second system controller having an access time longer than a non-access time of the first system controller, the memory having a duplex structure is provided between the data transmission paths so that, when it is desired to write data from the first system controller to these memories, the writing operation is carried out two times at different time points; while, when it is desired to perform a read access to the memories from the second system controller, the data is read out from one of the memories being not used. As a result, the data can be prevented from being interrupted during the access periods of the system controllers and thus the receiver system controller can receive the data of the same time and the same contents as the sender system controller, whereby accurate data transmission can be realized without any errors.

BRIEF DESCRIPTION OF THE DRAWINGS

FIGS. 4(a) to 4(e) are timing charts showing the operation of the system of the first embodiment;

BEST MODE FOR CARRYING OUT THE INVENTION

Figure 1:
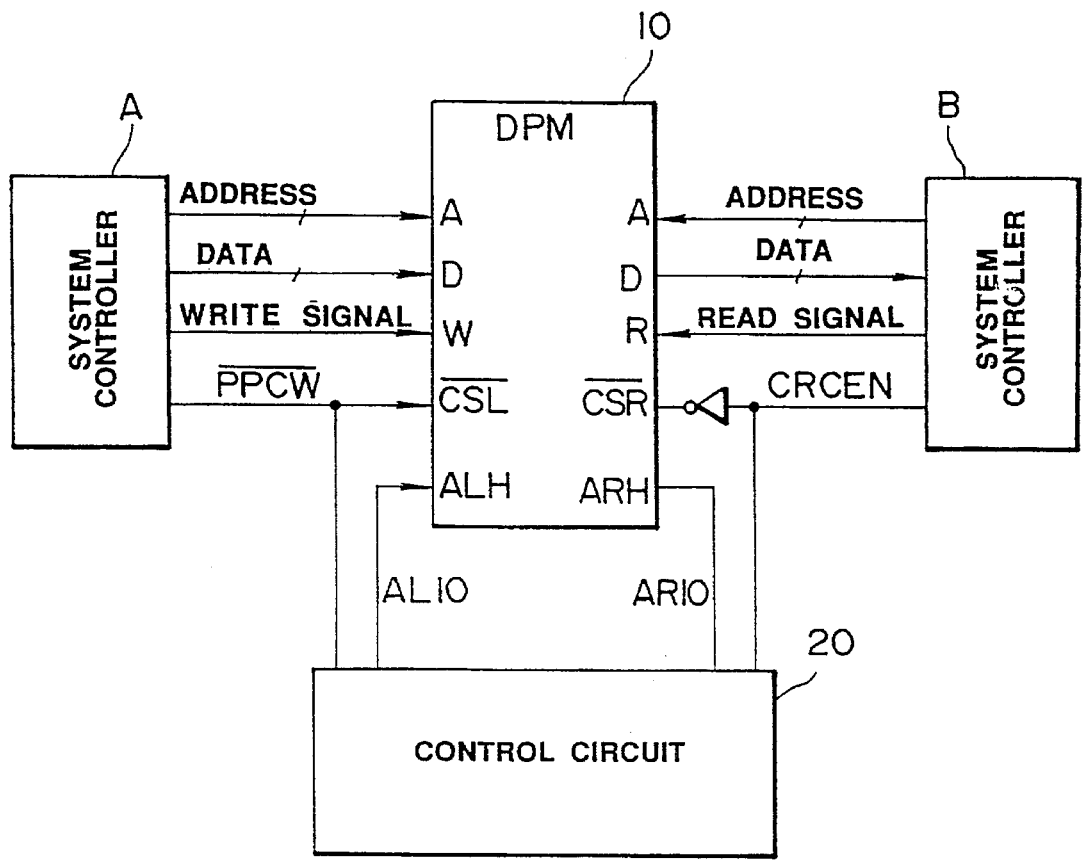
FIG. 1 is a block diagram of a first embodiment of the present invention.

The present invention will be detailed in connection with embodiments of the invention showing in the attached drawings. FIG. 1 shows a conceptional arrangement of a first embodiment of the present invention.

In the arrangement shown in FIG. 1, it is supposed to transmit data from a system controller A to a system controller B (which will be abbreviated merely to the controller, hereinafter). The controllers A and B operate fully asynchronously.

Figure 2:
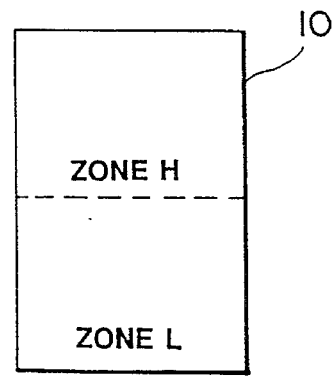
FIG. 2 conceptionally shows memory division in the first embodiment.

A memory 10 comprises a dual port memory (DPM) which can be accessed from both of the controllers A and B for its writing/reading operation. In the illustrated example, the memory area of the dual port memory is divided, as shown in FIG. 2, into two zones H and L which are selected by whether the uppermost bit ALH or ARH of an address A of the dual port memory is H or L. More specifically, when the dual port memory is accessed from the controller A, the uppermost bit ALH is set to be H or L, so that the H or L region is selected; whereas, when the dual port memory is accessed from the controller B, the uppermost bit ARH is set to be H or L, so that the H or L region is selected. That is, in this case, the memory 10 has a so-called duplex structure.

Contents of signals given in FIG. 1 are as follows. In the present specification, underbar "_" following a signal such as CSL_ denotes a logical inversion symbol in negative logic.

A: Address signal (not including the uppermost address)

D: Data

W: Write signal (one data unit)

R: Read signal (one data unit)

CSL_: Chip select terminal of the memory 10 from the left side (controller A)

CSR_: Chip select terminal of the memory 10 from the right side (controller B)

ALH: Uppermost address bit of the memory 10 and also refers to a signal terminal for division of the memory 10 into two H/L zones from the left side (controller A)

ARH: Uppermost address bit of the memory 10 and also refers to a signal terminal for division of the memory 10 into two H/L zones from the right side (controller B)

PPCW_: Keeps its low (L) state during a series of write periods of the controller A CRCEN: Keeps its high (H) state during a series of read periods of the controller B AL10: Write area selection signal (which selects the zone L for L while selects the zone H for H)

AR10: Read area selection signal (which selects the zone L for L while selects the zone H for H)

In this case, since data transmission is intended only in one direction from the controller A to the controller B as explained above, the controller A performs only its writing operation while the controller B performs only its reading operation. Further, in the data transmission, it is supposed that a plurality of data are processed during one write or read period, for which reason a plurality of write signals W are present during the L period of the signal PPCW_ and similarly a plurality of read signals R are present during the H period of the signal CRCEN.

Figure 3:
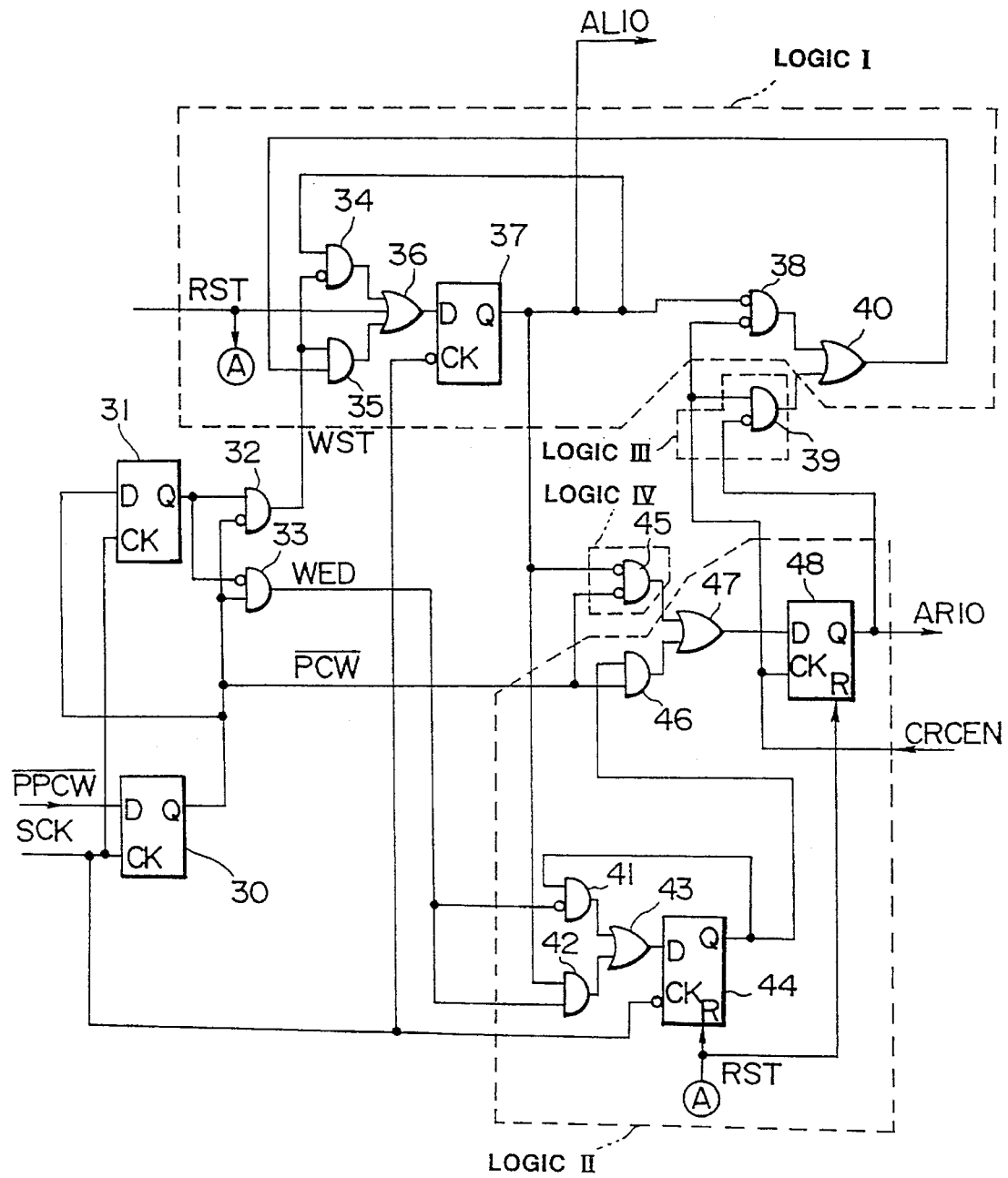
FIG. 3 shows details of a control circuit of a system of the first embodiment.

A control circuit 20 functions to control the writing/reading operation of the memory 10 on the basis of the signal PPCW_ received from the controller A and the signal CRCEN received from the controller B, that is, to control the selecting operation of the access L and H zones of the duplex memory 10. A specific arrangement of the control circuit is shown in FIG. 3.

The control of the control circuit 20 over the writing/reading operation of the memory 10 is carried out based on the following logic.

Logic I:

When no reading operation is made at the time of starting the writing operation, the writing operation to the L and H zones of the duplex memory 10 is alternately carried out in such a manner that L zone→H zone→L zone→H zone→... according to the transmission period of the signal PPCW_. In other words, when the H zone is selected in a write period during which the signal PPCW_ is transmitted, the L zone opposite to the H zone is selected for the next write period.

Logic II:

When no writing operation is made at the time of starting the reading operation, the same zone as the immediately previously written zone is selected and the reading operation is carried out over the selected zone. To this end, the control circuit 20 always stores and holds the immediately previously written zone therein.

Logic III:

When reading operation is already being effected at the time of starting the writing operation, the writing operation is carried out over the zone opposite to the reading zone.

Logic IV:

When writing operation is already being effected at the time of starting the reading operation, the reading operation is carried out over the zone opposite to the writing zone.

Logic V:

When the reading zone is judged by the rising edge of a system clock SCK and the writing zone is judged by the falling edge of the system clock SCK for example, zone decision at the same time can be prevented.

The brief explanation of the logic of the control circuit 20 has been made above.

Explanation will next be made as to the arrangement of the control circuit 20 embodying the above logic by referring to FIG. 3.

In FIG. 3, the write period signal PPCW_ from the controller A is received at a flop-flop (which will be abbreviated to FF, hereinafter) 30 which in turn latches the signal PPCW_ at the rising edge of the system clock signal SCK. An output of the FF 30 is applied to an FF 31, gates 32, 33, and so on. The FF 30 latches the output of the FF 30 at the rising edge of the clock signal SCK and applies its output to the gates 32 and 33.

The gate 32, which performs an AND operation over an inversion of the output of the FF 30 and the output of the FF 31, outputs a write period start signal WST which has an H state for a predetermined short time (more precisely, corresponding to one period of the system clock signal SCK) when the signal PPCW_ falls to its L state. The gate 33, which performs an AND operation over the output of the FF 30 and an inversion of the output of the FF 31, outputs a write period end signal WET which has an H state for a predetermined short time (more precisely, corresponding to one period of the system clock signal SCK) when the signal PPCW_ rises to its H state.

The arrangement of gates 34, 35, 36 and FF 37 latches a signal (indicative of one of the zones H and L) indicative of the writing zone selected by the arrangement of gates 38 to 40 and holds the value the latched signal until the next write period start signal WST becomes H (determines the writing zone for each start of the write period). The FF 37 outputs the write zone selection signal AL10 which is supplied to the terminal ALH of the memory 10. Reference symbol RST denotes a reset signal which takes its H state when the power source is turned ON.

The gate 38 performs its AND operation over a logical inversion of the signal AL10 and a logical inversion of the read period signal CRCEN received from the controller B, and inputs an ANDed output to the OR gate 40. The gate 39 performs its AND operation over the signal CRCEN and a logical inversion of the zone selection signal AR10 and inputs its ANDed output to the OR gate 40. This circuit Dart determines the writing zone for the controller A according to the access state (signal CRCEN) of the controller B. That is, this circuit part selects the zone opposite to the zone which the controller A accessed in the previous time (logical inversion of the signal AL10) when the controller B is in its non-access state L in the signal CRCEN); whereas, this circuit part selects the zone opposite to the zone which the controller B is accessing at the current time (logical inversion of the signal AR10) when the controller B is in its access state (H in the signal CRCEN).

In more detail, the aforementioned arrangement of the circuits 34 to 37 and gates 38, 40 realizes the aforementioned logic I, that is, the alternate switching control of the zones H and L in the write control mode; while the gate 39 realizes the aforementioned logic III. And a selection result of the writing zone by the gates 38 to 40 is selected by the gate 35 at the time of starting the writing operation, and further the selection result is applied as the write zone selection signal AL10 to the address uppermost bit ALH of the memory 10 through the FF 37.

Next, the arrangement of gates 41 to 43 and FF 44 realizes the storing and holding operation of the immediately-previously written zone in the aforementioned logic II. More specifically, the gate 42 selects the write zone selection signal AL10 when the write period end signal WED is output, while the other circuits 41, 43 and 44 hold the selected result.

The arrangement of gates 45 to 47 and FF 48 realizes the aforementioned logic II and IV. That is, the gate 45 performs its AND operation over a logical inversion of the signal AL10 and a logical inversion of the output (signal PCW_) of the FF 30 and inputs its ANDed output to the OR gate 47. Meanwhile, the gate 46 performs its AND operation over the output of the FF 44 and the output (signal PCW_) of the FF 30 and inputs its ANDed output to the OR gate 47.

This circuit part functions to determine the reading zone of the controller B according to the access state (signal PCW_) of the controller A synchronized by the FF 30. That is, when the controller A is in the non-access state (H in the signal PCW_), this circuit part selects the same zone as the immediately-previously written zone (output of the FF 44); while, when the controller A is in the access state (L in the signal PCW_), this part selects the zone opposite to the current access zone of the controller A (logical inversion of the signal AL10). More specifically, the gate 46 corresponds to the aforementioned logic II and the ate 45 corresponds to the aforementioned logic IV. The FF 48 latches the output of the gate 47 at the rising edge of the signal CRCEN, whereby the selection result of the reading zone by the gates 45 to 47 is input to the FF 48 at the time of starting the reading operation and then applied to the address uppermost bit ARH of the memory 10 as the reading zone selection signal AR10.

The synchronism of the present control circuit is adjusted so that the signal CRCEN received from the controller B is changed in its state by the rising edge of the system clock signal SCK. For this reason, the FF 48 judges the reading zone by the rising edge of the system clock signal SCK. Meanwhile, the FF 37 judges the writing zone by the falling edge of the system clock signal SCK. In this way, the aforementioned logic V is realized.

Shown in FIGS. 4(a) to 4(e) are timing charts showing how the zone H or L is selected in accordance with various states (a) to (f) of the signals PPCW_ and CRCEN. Reference symbols H and L attached to the respective signals denote the selected zone H or L of the memory 10, and symbols I, II, III and IV given to arrows correspond to the aforementioned logic I, II, III and IV.

For example, in FIG. 4(a), since the controller A is accessing the zone L of the memory 10 at a time t0, the zone H is selected as the access zone of the controller B (logic IV). The same holds true for a time t1 and thus the zone H is selected based on the logic IV.

At a time t2, since the controller A is in the non-access state to the memory 10, the same zone as the immediately-previously written zone, that is, the zone L is selected as the access zone of the controller B (logic II).

At a time t3, since the controller B is in the non-access state to the memory 10, the zone opposite to the immediately-previously written zone, that is, the zone H is selected as the access zone of the controller A (logic I).

At a time t4, the controller A is accessing the zone H of the memory 10, the zone L is selected as the access zone of the controller B (logic IV).

At a time t5 in FIG. 4(b), when the controller A accesses the memory 10, the controller B is in the access state to the zone H of the memory 10, the zone L is selected as the access zone of the controller A (logic III).

Thereafter, the access zone of the memory 10 is similarly determined based on any of the logic I to IV.

In accordance with the arrangement of the first embodiment, as will be seen also from FIG. 4, suitable data transmission can be realized from the controller A to the controller B without any need for establishing synchronism between the controllers A and B.

Although the above explanation has been made in connection with the case where the memory 10 is divided into two by the uppermost bit address in the foregoing embodiment, the duplex memory may be divided into two by a bit other than the uppermost bit or may comprise two different chips. Further, the logical arrangement of the control circuit 20 may have an arbitrary logical arrangement so long as the logical arrangement can have substantially the same function as the control circuit 20.

Figure 5:
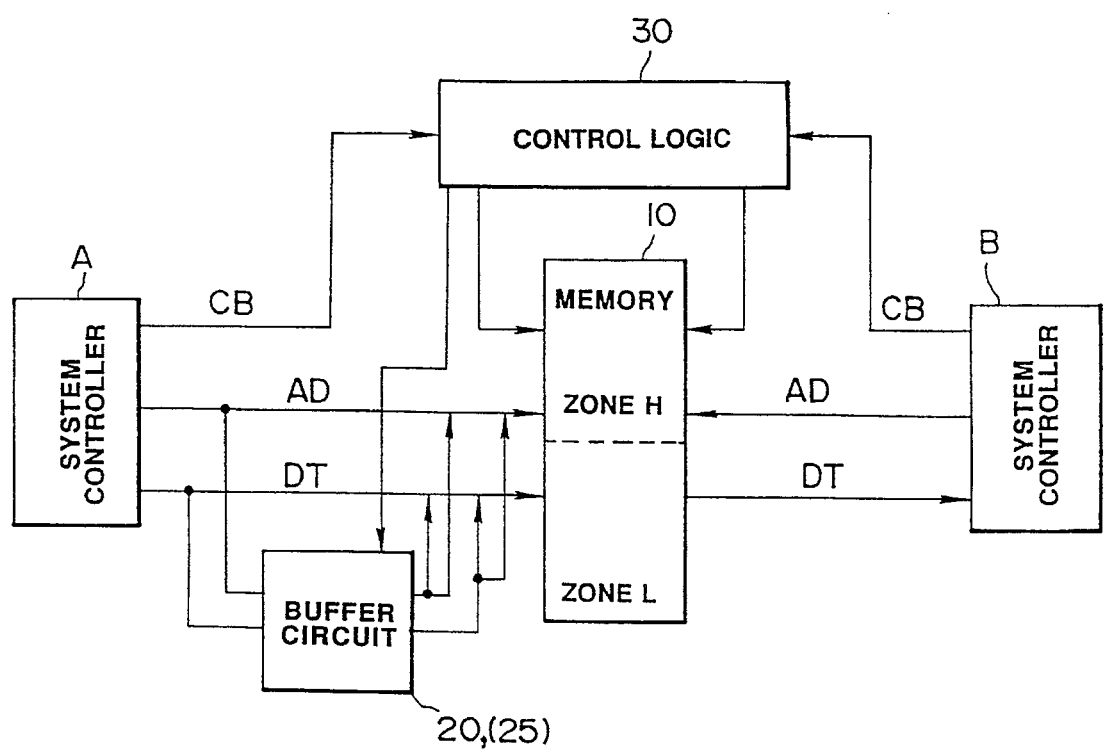
FIG. 5 is a block diagram of a second embodiment of the present invention.
Figure 6:
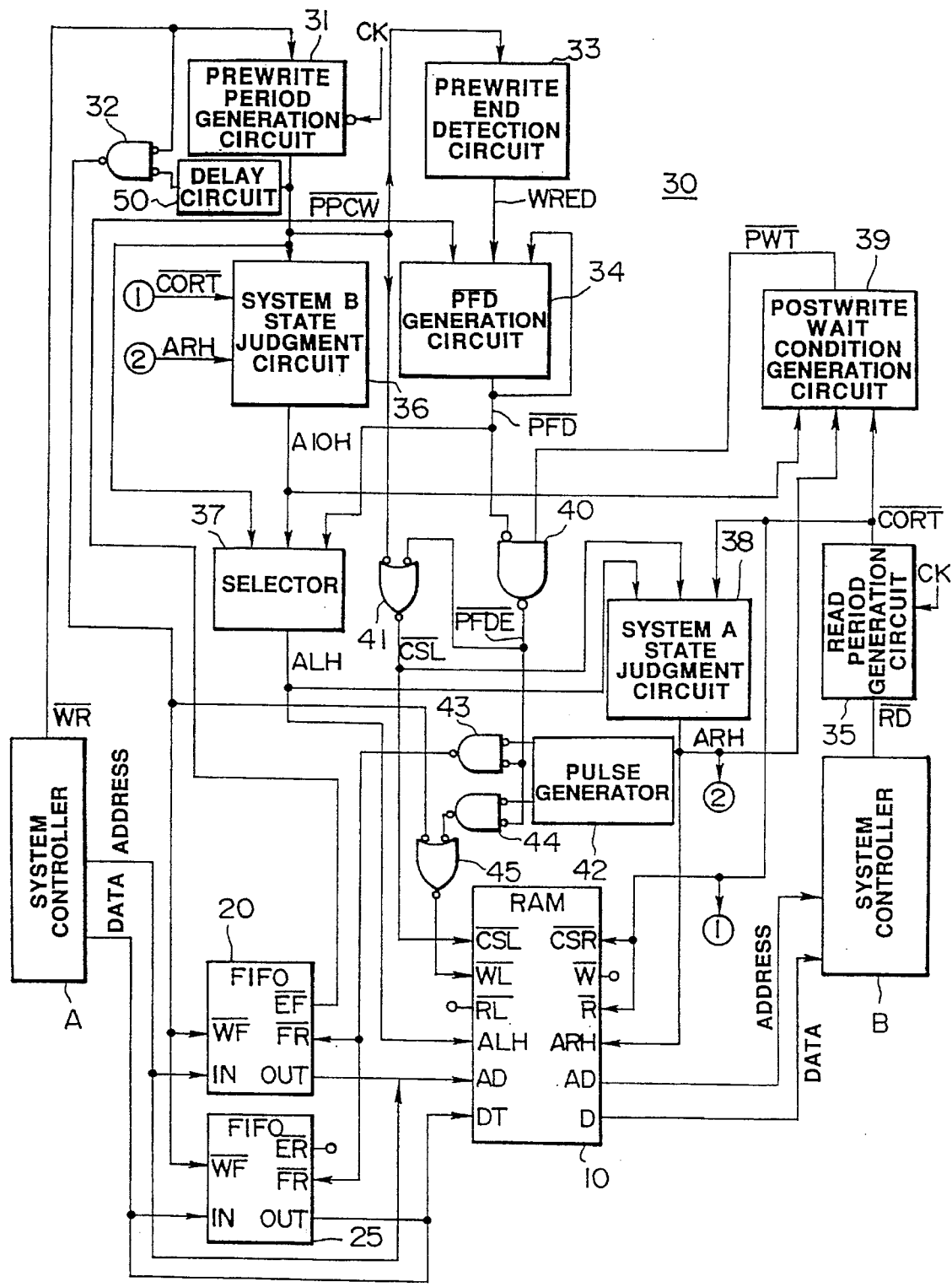
FIG. 6 shows detailed block diagram of an arrangement of an internal circuit of a system of the second embodiment.

FIG. 5 shows a conceptional arrangement of a second embodiment of the present invention and FIG. 6 shows details of the arrangement.

In FIGS. 5 and 6, the system controllers A and B are installed, for example, in an industrial machine. In the illustrated example, the system controller (which will be abbreviated to the controller, hereinafter) A, which is a master controller for performing general control over the entire industrial machine, has an ordinary computer configuration including a CPU and a memory. Meanwhile, the system controller B performs data transfer with sensors and actuators installed in various portions of the industrial machine.

The arrangement of FIG. 5 is intended to transmit data from the controller A to the controller B. And it is also assumed that, with respect to the memory access period of the controllers A and B, a non-access time TNA (in the illustrated example, non-write time) of the controller A to the memory is set to be longer than a memory access period TB (in the illustrated example, read time) of the controller B to the memory.

More precisely, the following relationship is assumed to be satisfied.

Figure 7:
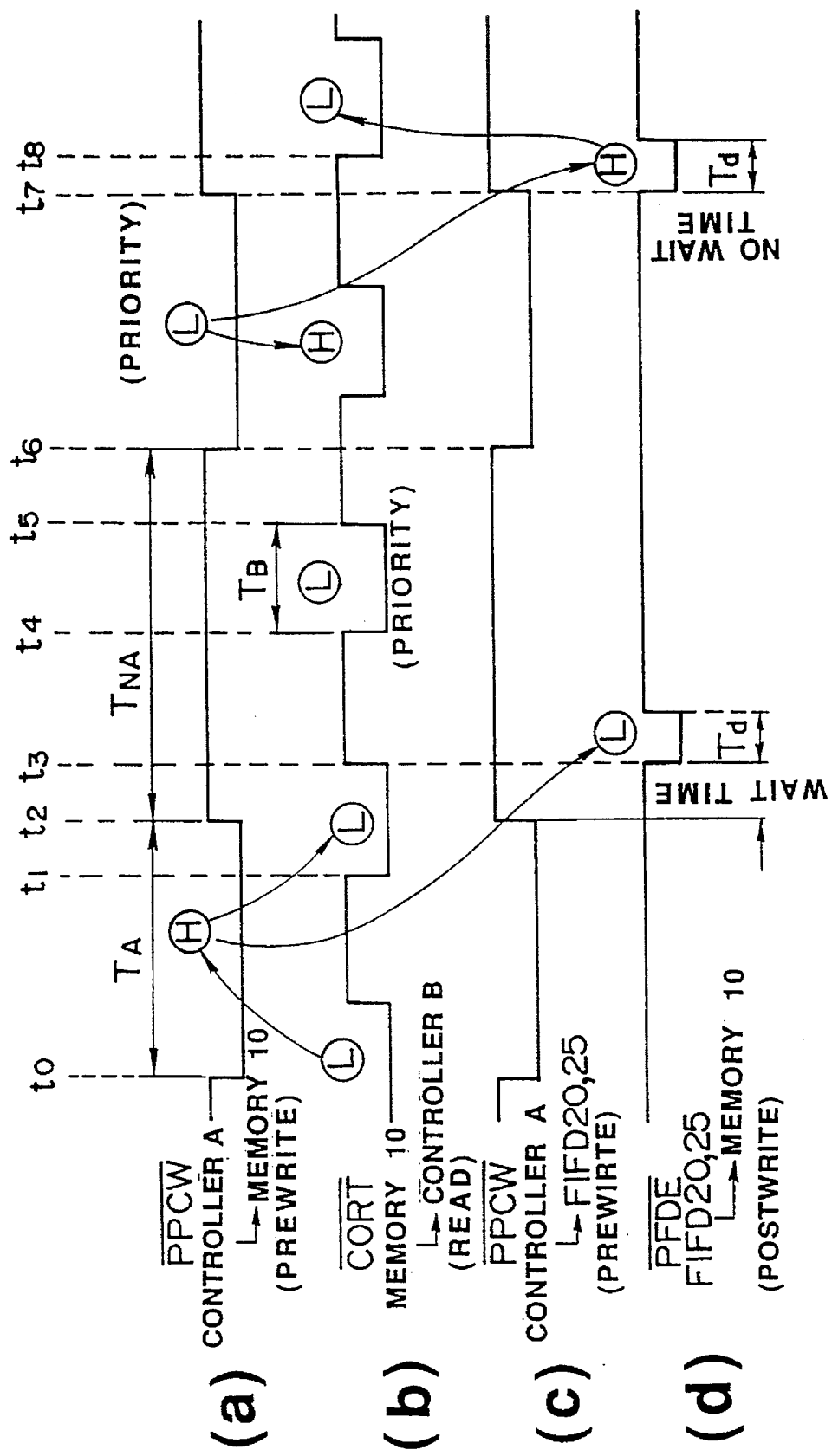
FIG. 7 is a timing chart conceptionally showing the operation of the system of the second embodiment.

Non-access time *TNA* of system A>Time *Td* necessary for post-writing+Access time *TB* of system B (For TNA, Td, TB, refer to FIG. 7)

The memory 10 comprises a dual port memory (DPM) which can be accessed from both of the controllers A and B for its writing/reading operation. In the illustrated example, the memory area of the dual port memory is divided, as shown in FIG. 2, into two zones H and L which are selected by whether the uppermost bit ALH or ARH of an address A of the dual port memory is H or L. More specifically, when the dual port memory is accessed from the controller A, the uppermost bit ALH is set to be H or L, so that the H or L region is selected; whereas, when the dual port memory is accessed from the controller B, the uppermost bit ARH is set to be H or L, so that the H or L region is selected. That is, in this case, the memory 10 has a so-called duplex structure and eventually exactly the same data is written in the zone H and L of the memory 10 for each write period of the controller A under such control of a control logic 30 as will be explained later.

In this case, since data transmission is assumed to be carried out only in one direction from the controller A to the controller B as mentioned earlier, the controller A performs only its writing operation while the controller B performs only its reading operation.

Provided between the controller A and the memory 10 is a buffer circuit 20 which, when it is desired to write data from the controller A to the memory 10, temporarily stores therein output data DT and an address AD of the controller A and thereafter which outputs the temporarily stored data to either one of the zones H and L of the memory 10. In the illustrated example, the buffer circuit comprises two first-in-first-out circuits (FIFOs) 20 and 25. In more detail, the FIFO 20 stores therein the address from the controller A, while the FIFO 25 stores therein the data from the controller.

Prior to explanation of the internal structure of the control logic 30, explanation will be directed to the input/output terminals of the memory 10 and FIFOs 20 and 25.

CSL__: Chip select terminal from the left side (control A) of the memory 10

CSR__: Chip select terminal from the right side (control B) of the memory 10

WL__: Write enable signal of the memory 10

R__: Read enable signal of the memory 10

ALH: Uppermost address bit of the memory 10 and also refers to a signal for division of the memory 10 into the zones H and L from the left side (controller A)

ARH: Uppermost address bit of the memory 10 and also refers to a signal for division of the memory 10 into the zones H and L from the right side (controller B)

AD: Address signal

DT: Data

WF__: Write enable signal of FIFOs

EF__: Data empty flag issued from the FIFO (H when there is storage data in the FIFO and L all the storage data area read out from the FIFO)

FR__: Read enable signal of the FIFOs

IN: Data input terminals of the FIFOs

OUT: Data output terminals of the FIFOs

The control logic 30, which is connected to control buses CB of the controllers A and B as shown in FIG. 5 (more precisely, which receives a write request signal WR__ from the controller A and a read request signal RD from the controller B), controls the writing/reading operation of the memory 10 and FIFOs 20, 25. More specifically, the control logic 30 includes a plurality of circuits 31 to 45 as shown in FIG. 6. The plurality of circuits of the control logic 30 forms its control logic configuration in the form of hardware including flip-flops and logical gates.

Prior to explanation of the respective structures of the circuits of the control logic 30, explanation will be briefly made as to the logical configuration of the control of the writing/reading operation of the control logic 30 over the memory 10 and FIFOs 20, 25.

(1) First, with respect to the writing/reading operation of the memory 10, the zone L is set to be higher in priority than the zone H.

(2) When the write request signal WR__ is issued from the controller A, two writing operations are carried out as shifted in writing time to the memory 10, so that the same data of the controller A is written in the zones H and L of the memory 10.

In the first writing operation (which will be referred to as the prewriting operation, hereinafter), the data is written both in either one of the zones H and L of the memory 10 and in the FIFO 25 at the same time, while the address is written in the FIFO 20. The selection of the zones L and H of the memory 10 is determined by the state of the controller B at the time of starting sending the signal WR_ from the controller A. When the controller B is accessing either one of the zones L and H of the memory 10 for reading operation, writing operation is carried out for the opposite zone; while, when the controller B is not accessing the memory 10, writing operation is carried out for the zone L having a higher priority.

In the second writing operation (which will be referred to as the post-writing operation, hereinafter), the data written in the FIFO 25 and the address in the FIFO 20 in the above prewriting operation are read out from the FIFOs 25 and 20 immediately after completion of the prewriting operation, and the read-out data are written into the zone H or L of the memory 10 opposite to the zone selected in the prewriting operation according to the address issued from the FIFO 20. At the time of starting the post-writing operation, if the controller B is accessing the zone into which the data from the FIFO 25 is to be written, the controller A waits for the access completion of the controller B, immediately after which the postwriting is carried out.

(3) When the read request signal RD_ is issued from the controller B, the state of the controller A at the time of starting sending the signal RD is judged. If the controller A is accessing the memory 10 to write either one of the zones H and L, reading operation is carried out from the opposite zone, while, if the controller A is not accessing the memory 10, reading operation is carried out from the zone L having a higher priority.

(4) The state of the party controller, for example, the state of the controller B is judged by the rising edge of a system clock signal CK while the state of the controller A is judged by the falling edge of the system clock signal CK, whereby the judgment at the same time can be prevented.

The logic of the control logic 30 has been briefly explained in the foregoing. Next, the operation of the arrangement of FIG. 5 will be briefly explained by referring to a timing chart of FIG. 7.

In FIG. 7, (a) shows a write state from the controller A to the memory 10, (b) shows a read state of the controller B, (c) shows a write state from the controller A to the FIFOs 20 and 25, and (d) shows a post-writing operation. Reference symbol L given to the respective signals means that the associated signal is active. Further, symbols H and L given above the signals denote the zones H and L of the memory 10.

At a time t0, since the controller B is accessing the zone L of the memory 10, the zone H is selected as the zone to be accessed from the controller A. As a result, during a period between the time t0 and time t2, the data of the controller A is written in the zone H of the memory 10 and the data and address of the controller A are written in the FIFOs 25 and 20, whereby the prewriting operation is carried out. In the reading operation of the controller B in a period between the time t1 and t3, since the zone H of the memory 10 is occupied by the controller A at the time t1, the zone L is selected as the access zone of the controller B.

Then, at the time t2 at which the prewriting operation of the controller A is completed, the zone L for the postwriting operation is occupied by the controller B. Accordingly, the control logic 30 waits for the access completion of the controller B and from the time t3, starts the postwriting operation. It takes a time Td in the postwriting operation.

Next, in the access period of the controller B between time t4 to time t5, since the zones H and L of the memory 10 are both empty, the zone L having a higher priority is selected.

Thereafter, even at a time t6 at which the accessing of the controller A is started, since the zones H and L of the memory 10 are both empty, the controller A performs the prewriting operation over the zone L having a higher Of course, at the same time, the data and address of the controller A are written in the FIFOs 25 and 20.

At a time t7 at which the prewriting operation of the controller A is completed, the controller B does not access the zone H to be subjected to the postwriting operation. Accordingly, in this case, the postwriting operation is carried out immediately from the time t7 without any waiting time. Since the postwriting operation is carried out over the zone H of the memory 10 at a time t8, the zone L is selected as the zone of the controller B to be read.

Explanation will next be made as to the structures of the circuits of the control logic 30 by referring to FIG. 6. Although the system clock signals CK are given actually in various Darts, only the major system clock signals CK are input in FIG. 6 and the other clock signals are omitted.

The write request signal WR_ (refer to FIG. 8(a)) of the controller A is input to the prewrite period generation circuit 31 and the gate 32. The pulse period of the system clock signal CK is sufficiently shorter than the pulse width of the write request signal WR_.

The postwriting period generation circuit 31, which is made up of a one-shot multivibrator, a flip-flop or the like, receives the write request signal WR_ at the timing of the falling edge of the system clock signal CK and thereafter generates a signal PPCW having an L state kept for a predetermined time TA and outputs it (refer to FIG. 8(b)). The signal PPCW_ is a flag signal indicating that the controller A is in the writing operation (that is, in the prewriting operation) when the signal level of the signal PPCW_ is L.

The gate 32 receives an output (delayed by a predetermined time) of a delay circuit 50 receiving the signal PPCW_ and an inversion of the signal WR_ and applies its NANDed output to the terminals WF_ of the FIFOs 20 and 25, etc. (refer to FIG. 8(c)). The FIFOs 20 and 25, when the inputs to the terminal WF_ are L, writes the address and data signals issued from the controller A into the storage areas of the FIFOs 20 and 25.

The prewrite end detection circuit 33, when detecting a rising edge in the signal PPCW_ from its L state to H, outputs a signal WRED indicative of end of the prewriting operation.

The PFD_ generation circuit 34, which comprises a plurality of logical gates, flip-flops, etc., receives the signal EF_ from the FIFO 20, the signal WRED and a feedback signal. As has been already explained, the signal EF_ (refer to FIG. 8(h)) is an empty flay for the FIFO 20 and is at the H state during the aforementioned prewriting and postwriting operation. The PFD generation circuit 34 generates a signal PFD_ which falls ah the timing of the rising edge of the signal WRED, i.e., the rising edge of the signal PPCW_ and rises at the timing of the falling edge of the signal EF_. In other words, the signal PFD_ is at the L state from the end of the prewriting operation until the end of the postwriting operation. The signal PFD_ is latched by the falling edge of the signal CK.

Figure 8:
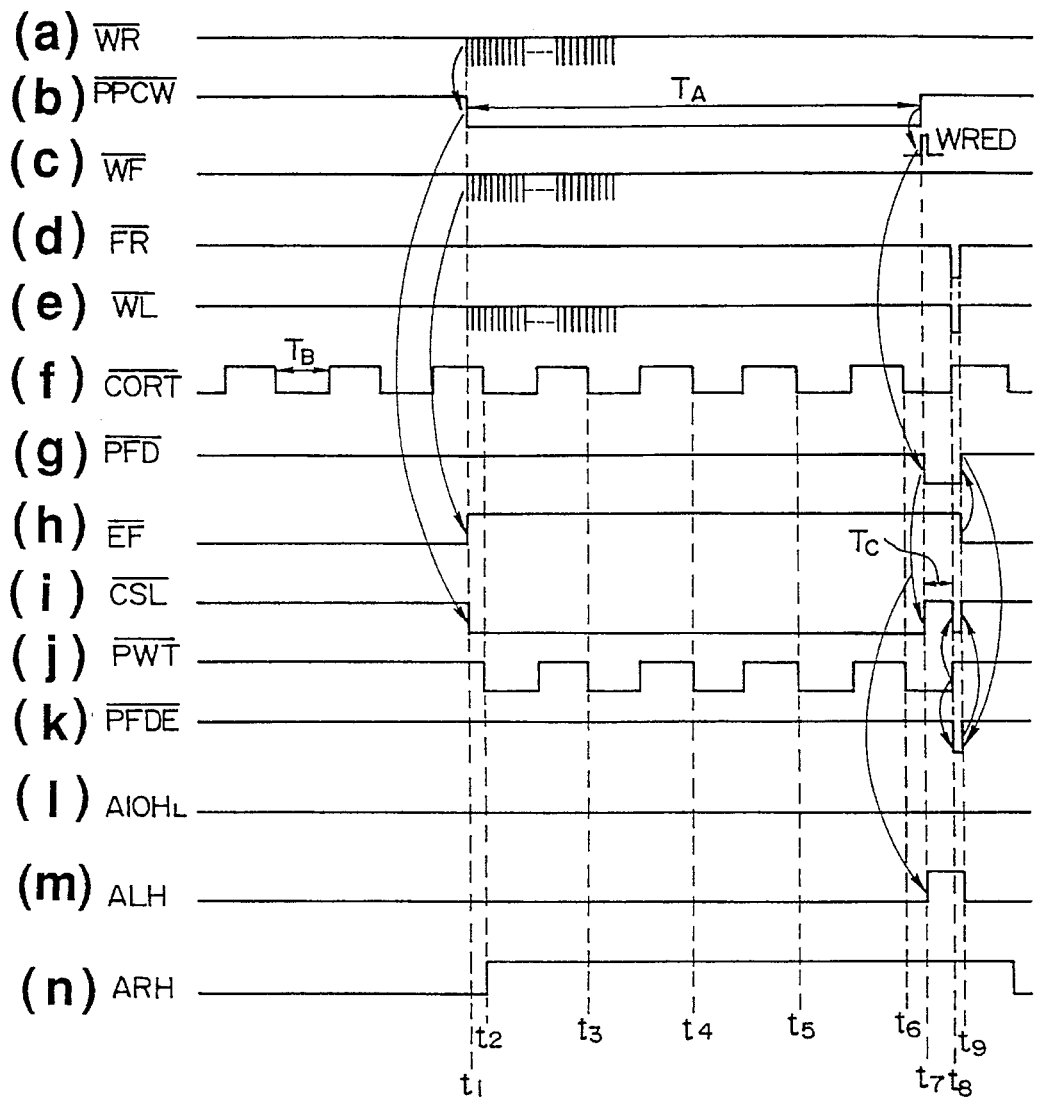
FIGS. 8 to 10 are timing charts for explaining the specific operation of the system of the second embodiment respectively.

The read period generation circuit 35, which comprises a flip-flop, latches the read request signal RD_ issued from the controller B at the rising edge of the system clock and outputs a read period signal COT__ of the controller B (refer to FIG. 8(*f*)). During the reading operation of the controller B, the output signal CORT__ is kept at its L state. The signal CORT__ is input to the terminals CSR__ and R__ of the memory 10. Accordingly, during the L state of the signal CORT__, the stored data is always read out from either one of the zones H and L of the memory 10. That is, the reading operation is carried out without any waiting time.

The selection of the zone H or L for reading operation is determined by a signal ARH (refer to FIG. 8(*n*)) issued from the system A state judgment circuit 38. The logical configuration (which will be also detailed later) of the system A state judgment circuit 38 will now be briefly explained. That is, the output ARH of the judgment circuit 38 is determined by the states of the signals CSL__ and ALH when the signal CORT__ falls to the L state, which true table is given in Table 1 below.

TABLE 1

| CSL__ | ALH | ARH |
|---|---|---|
| H |   | L |
| L | H | L |
| L | L | H |

The signals CSL__ and ALH show the states when the signal CORT__ falls to the L state.

And when the signal ARH is in the H state, the zone H of the memory 10 is selected; while the signal ARH is in the L state, the zone L of the memory 10 is selected.

The system B state judgment circuit 36 judges the access state of the controller B at the timing of the falling edge of the signal PPCW__ to the L state on the basis of the states of the received signals CORT__ and ARH, determines the selection of the zone H or L of the memory 10 on the basis of the judgment result, and outputs a signal A10H indicative of the effect (refer to FIG. 8(*l*)).

That is, the signal A10H is determined by the states of the signals CORT__ and ARH when the signal PPCW__ falls to the L state (when the prewriting operation starts), which true table is given in Table 2 below.

TABLE 2

| CORT__ | ARH | A10H |
|---|---|---|
| H |   | L |
| L | H | L |
| L | L | H |

The signals CORT__ and ARH indicate the states when the signal PPCW falls to the L state.

That is, as mentioned above, the zone L of the memory 10 is set to be higher in priority than the zone H. For this reason, when the signal CORT__ is in the H state or the controller B is in the non-access state at the time of starting the prewriting operation, the signal A10H is changed to the L state for the priority zone (zone L0 of the memory 10; whereas, when the signal CORT__ is in the L state or the controller B is in the access state at the time of starting the prewriting operation, the signal A10H becomes opposite to the signal ARH and the zone opposite to the zone which the controller B is accessing is selected.

The selector 37 switches between the signal A10H and its inverted signal according to the states of the signals PPCW__ and PFD__ and outputs a signal ALH. More specifically, when the signal PPCW__ is in the L state (in the prewriting operation), the output ALH corresponds to the non-inverted output of the signal A10H; when the signal PFD is in the L state (from the end of the prewriting operation until the end of the postwriting operation), the output ALH corresponds to the inverted output of the signal A10H; and when the signals PPCW__ and PFD__ are in the H state, the priority zone L of the memory 10 is selected. In other words, the selector 37 is set to select, in the postwriting operation, the zone opposite the zone selected in the prewriting operation. The signal ALH issued from the selector 37 is applied to the terminal ALH of the memory 10 for selection of the zone H or L.

The postwrite wait condition generation circuit 39 generates part of conditions under which the postwriting operation from the FIFOs 20 and 25 to the memory 10 is awaited by the access of the controller B to the memory 10. The condition generation circuit 39 receives the signals CORT__, ARH__ and A10H and outputs a signal PWT__ (refer to FIG. 4(*j*)). The signal PWT__ is changed to the L state when the wait conditions given in Table 3 below are satisfied.

TABLE 3

| CORT__ | A10H | ARH | PWT__ |
|---|---|---|---|
| L | H | L | L |
| L | L | H | L |
|   | Otherwise |   | H |

Since an inverted signal of the signal A10H indicates the memory zone of the postwriting operation in Table 3, when the signals A10H and ARH (access zone of the controller B) coincide with each other and the signal CORT__ is in the L state (in the access state of the controller B), the signal PWT__ is changed to the L state because the postwriting operation must be awaited.

The signal PWT__ is input to the gate 40 to perform an AND operation of the signal PWT__ and an inversion signal of the signal PFD__, whereby the gate 40 outputs a signal PFDE__ (refer to FIG. 8(*k*)). That is, the gate 40 generates and outputs the signal PFDE__ which is in the L state only during the postwriting operation. The signal PFDE__ is also latched by the falling edge of the clock CK.

The signal PFDE__ is input to the gates 41, 43 and 44 The gate 41 performs a NOR operation of an inversion signal of the signal PFDE__ and an inversion signal of the signal PPCW__ and inputs its NORed output CSL to the terminal CSL of the memory 10. In other words, the gate 41 outputs the signal CSL__ which is L in the prewriting operation (PPCW__) and the postwriting operation (PFDE__), at which time the chip selection is carried out from the left side of the memory 10.

The signal CSL__ is also input to the system A state judgment circuit 38. The judgment circuit 38 judges the access state of the controller A at the moment the signal CORT__ falls to the L state on the basis of the received signals CSL__ and ALH, determines the selection of the controller B of the zone H or L of the memory 10 on the basis of the judgment result, and outputs the signal ARH indicative of the selection result (refer to FIG. 8(*n*)), which true table is given in Table 2 above. The signal ARH, like the signal ALH, when in the H state, selects the zone H of the memory 10; whereas, when in the L state, selects the zone L of the memory 10.

The gates 43 and 44 receive pulse signals having slightly shifted phases from the pulse generator 42, and switch between passage and blockage of the associated pulse signals on the basis of the signal PFDE__ received at the other terminals of the gates 43 and 44. That is, when the signal PFDE__ is in the L state, the gates 43 and 44 generate the pulse signals from the pulse generator 42 respectively.

The pulse signal passed through the gate 43 is input to the terminals FR__ of the FIFOs 20 and 25. Accordingly, the address and data already stored in the FIFOs 20 and 25 in the prewriting operation are output therefrom according to the output pulse of the pulse generator when the signal PFDE_ becomes the L state. The address issued from the FIFO 20 is input to the terminal AD of the memory 10, while the data issued from the FIFO 25 is input to the terminal DT of the memory 10.

Meanwhile, the pulse signal passed through the gate 44 is input to the gate 45. The gate 45 performs an NOR operation of the output of the gate 32 and the output of the gate 44 and inputs its NORed output to the terminal WL_ of the memory 10. That is, the gate 45 performs its NOR operation of the output (signal WR_ during the L state of the signal PPCW_, in the prewriting operation) of the gate 32 indicative of the in-prewriting state and the output (the output of the pulse generator during the L state of the signal PFDE_) of the gate 44 indicative of the in- postwriting state, and inputs a pulse train necessary for the postwriting operation to the terminal WL_ of the memory 10.

In this case, since the postwriting operation is based on the control of the outputs of the FIFOs 20 and 25, the length of the postwriting operation (PFDE_) is set to be much shorter than in the prewriting operation (PPCW_) so that a pulse signal having pulses corresponding in number to the signal WR_ during the L state of the signal PFDE_. This is because the signal PFDE_ is changed to the H state by the signal EF_ issued from the FIFO, the prewriting end detection signal WRED and the postwriting wait condition signal PWT_ to always mask the pulse received from the pulse generator 42. The pulse generator also controls the phase and duty of the pulses which is to be sent to the gates 43 and 44 and which form the base of the signal WL_ of the memory 10.

The arrangement of the control logic 30 has been explained in the foregoing. Next, the operation of the control logic will be explained by referring to a timing chart of FIG. 8.

At a time t1, the first signal WR_ is output from the controller A (FIG. 8(a)). The prewrite period generation circuit 31 triggers the L state of the first signal WR_ at the falling edge of the clock CK and thereafter outputs the signal PPCW_ which keeps the L state for a predetermined time TA (FIG. 8(b)). The gate 32 receives the delayed output of the signal PPCW_ and the signal WR_ and outputs its NANDed output to the terminals WF_ of the FIFOs 20 and 25 and also to the terminal WL_ of the memory 10 through the gate 45 (FIG. 8(c) and (e)). The signals WF_ and WL_ denote write enable terminals respectively. At the same time (at the time t1), the signal PPCW_ is input to the terminal CSL_ of the memory 10 through the gate 41 (FIG. 8(d)) to enable the chip selection from the left side. Simultaneously with it, the system B state judgment circuit 36 judges the state of the controller B on the basis of the states of the signals CORT_ and ARH at the time (time t1) the signal PPCW_ falls, and outputs the signal indicative of the selection of either one of the zones H and L of the memory 10 on the basis of the judgment result.

In this case, since the signal CORT_ is in the H state and the signal ARH is in the L state at the time t1, the signal A10H is changed to the L state to select the priority zone L (refer to Table 2). The signal A10H is input to the terminal ALH of the memory 10 through the selector 37. As a result, in a period between the time t1 and t7 during which the signal PPCW_ is in the L state, the data of the controller A is written in the zone L of the memory 10 in synchronism with the signal WR_ of the system controller A, the address of the controller A is written in the FIFO 20, and further the data of the controller A is written in the FIFO 25, whereby the prewriting operation is executed.

Even during the prewriting operation, the accessing operation (reading operation) of the controller B is being carried out, so that the system A state judgment circuit 38 judges the access state of the controller A at the respective falling edges (times t2, t3, t4, t5 and t6) of the signal CORT_ and on the basis of the judgment result, selects one of the zones of the memory 10 to be accessed by the controller B. In this case, since the controller A selects the zone L of the memory 10 during the prewriting operation, the zone to be accessed by the controller B becomes the zone H as also seen from the signal ARH (refer to Table 1).

Thereafter, when the prewriting operation is completed, this is detected by the prewrite end detection circuit 33 in the form of the rising edge of the signal PPCW_, and the circuit 33 outputs the signal WRED (at the time t7).

The signal WRED causes the signal PFD_ issued from the PFD generation circuit 34 to fall to the L state at the time t7. Since the selector 37, as already explained above, outputs the inverted signal of the signal A10H during the L state of the signal PFD_, the signal ALH becomes the H state during a period between the time t7 and t9.

In this case, the controller B is accessing the zone H (A10H) of the memory 10 to read the zone H for the postwriting operation, the postwriting operation must be await for a wait time Tc. For this reason, the arrangement of the postwrite wait condition generation circuit 39 and gate 40 cause the postwriting operation to be started after the wait time Tc. More specifically, the signal PFDE_ falls to the L state by the rising edge of the signal CORT_ at the time t8, and at the time t9 after the time T9, the signal PFDE_ rises to the H state by the rising edge of the signal PFD_ caused by the rising edge of the signal EF_. The period between the time t8 and t9 corresponds to the postwriting operation duration, during which one output pulse of the pulse generator 42 based on the signal PFDE_ is input to the terminals FR_ (read enable) of the FIFOs 20 and 25 (FIG. 8(d)) while the other output pulse of the pulse generator 42 is input to the terminal WL_ (write enable) of the memory 10. Further, the terminal CSL_ of the memory 10 is also put in the chip selection state by the signal PFDE_.

Figure 10:
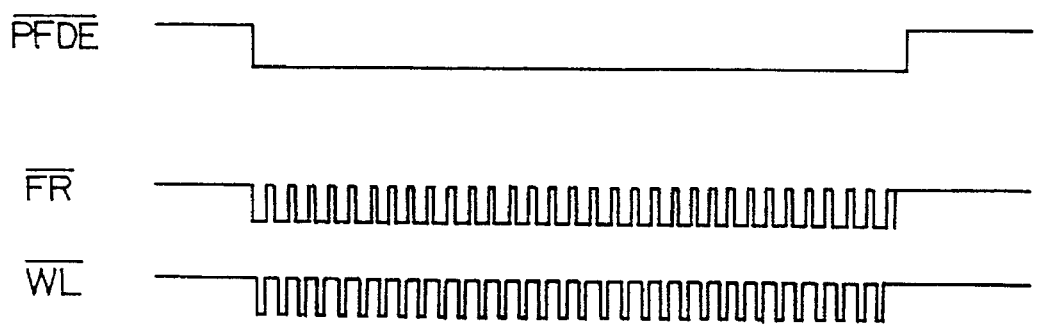

Therefore, in a period between the time t8 and t9, the output of the FIFO 20, i.e., the address signal issued from the controller A in the prewriting operation is input to the terminal AD of the memory 10, while the output of the FIFO 25, i.e., the data issued from the controller A in the prewriting operation is input to the terminal DT of the memory 10. Further, at this time, since the terminal ALH is at H, the data issued from the controller A in the prewriting operation is eventually written in the zone H of the memory 10. And as a result of the postwriting operation, the storage contents of the zone L of the memory 10 becomes exactly the same as that of the zone H. FIG. 10 shows an exemplary accurate timing chart of the signals PFDE_, FR_ and WL_ in the postwriting operation.

Figure 9:
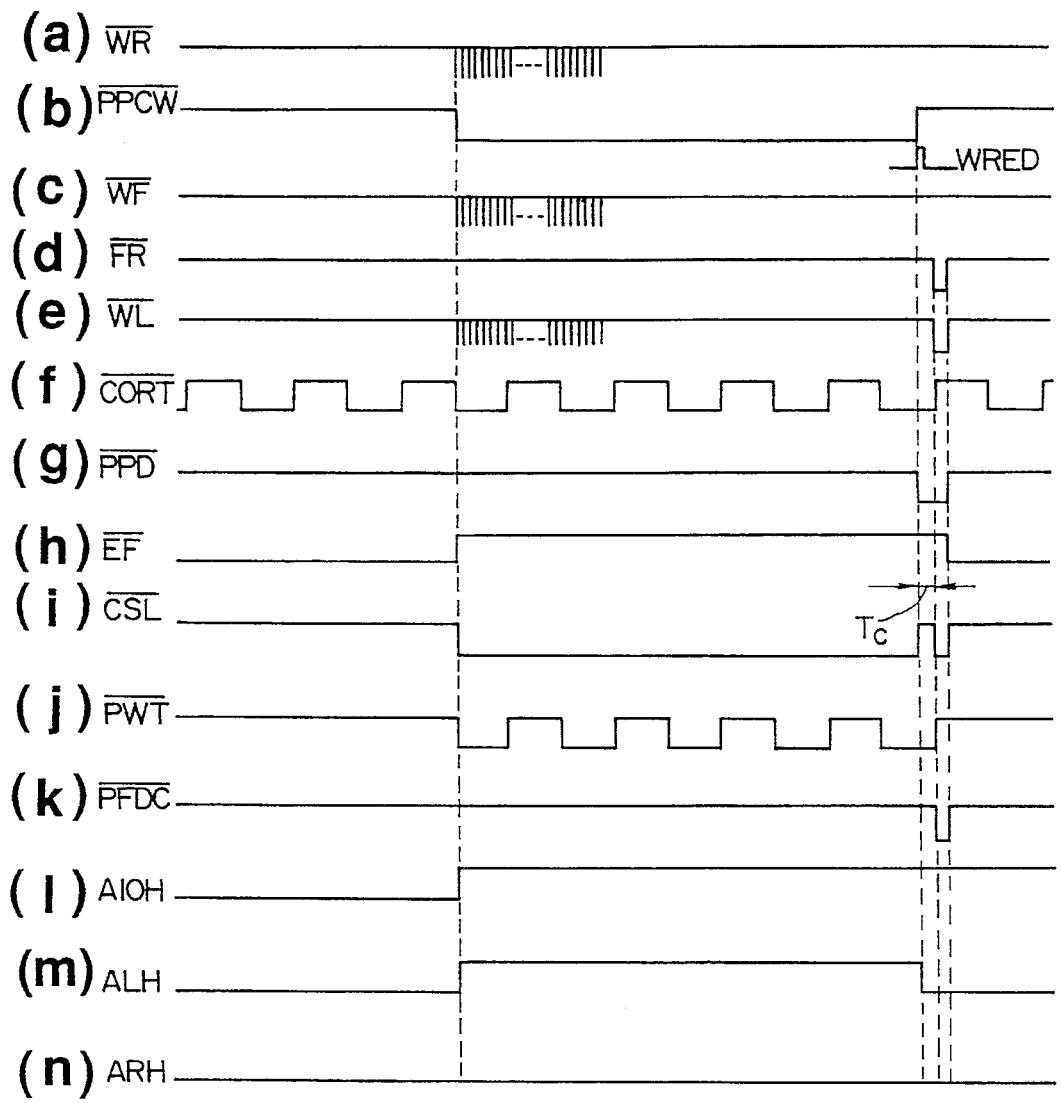

FIG. 9 shows another example regarding the access period (PPCW_) from the controller A and the access period (CORT_) from the controller B and its basic operation is substantially the same that of FIG. 8 and thus its explanation is omitted. Even in FIG. 9, the postwrite wait period Tc is somewhat present.

Although the memory 10 has been divided into two by the uppermost bit address in the foregoing embodiment, the memory may has a duplex structure to divide the memory by a bit other than the uppermost bit or the memory may comprise two different chips. The logic configuration of the control logic 30 may be replaced by an arbitrary logic configuration so long as it can attain the equivalent function to the above. Furthermore, the buffer circuit may comprise an assembly of ordinary flip-flops in place of the FIFOs.

Figure 11:
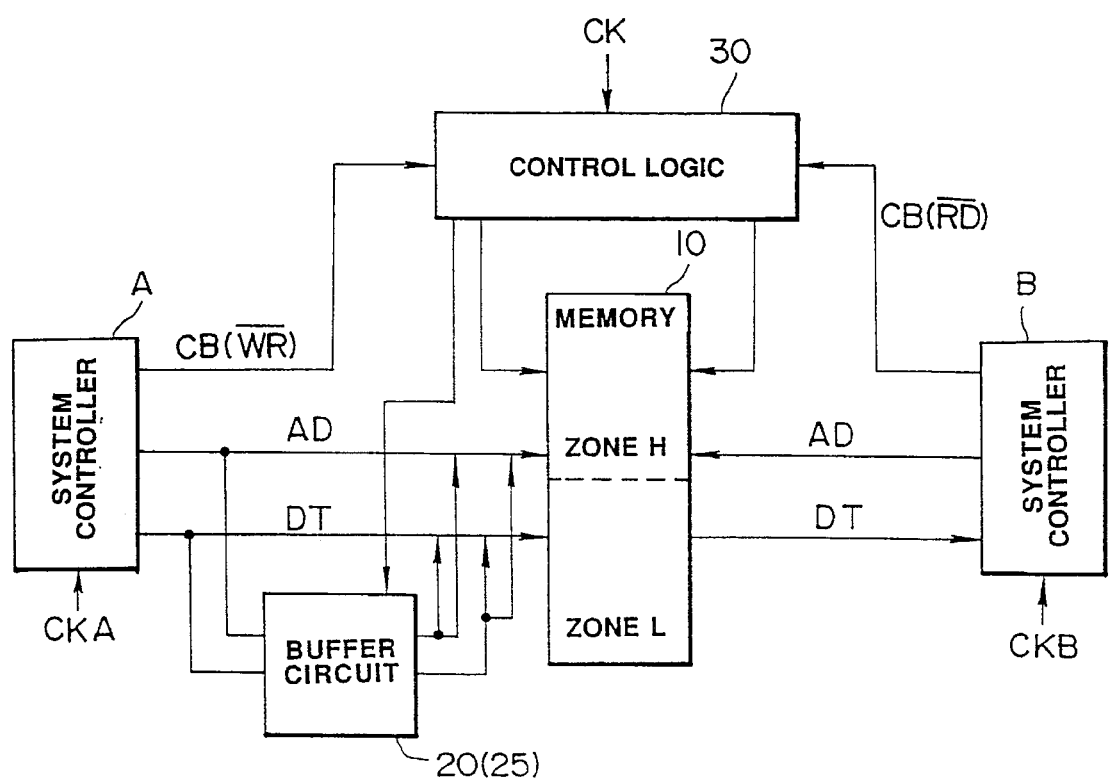
FIG. 11 is a block diagram of a third embodiment of the present invention.
Figure 12:
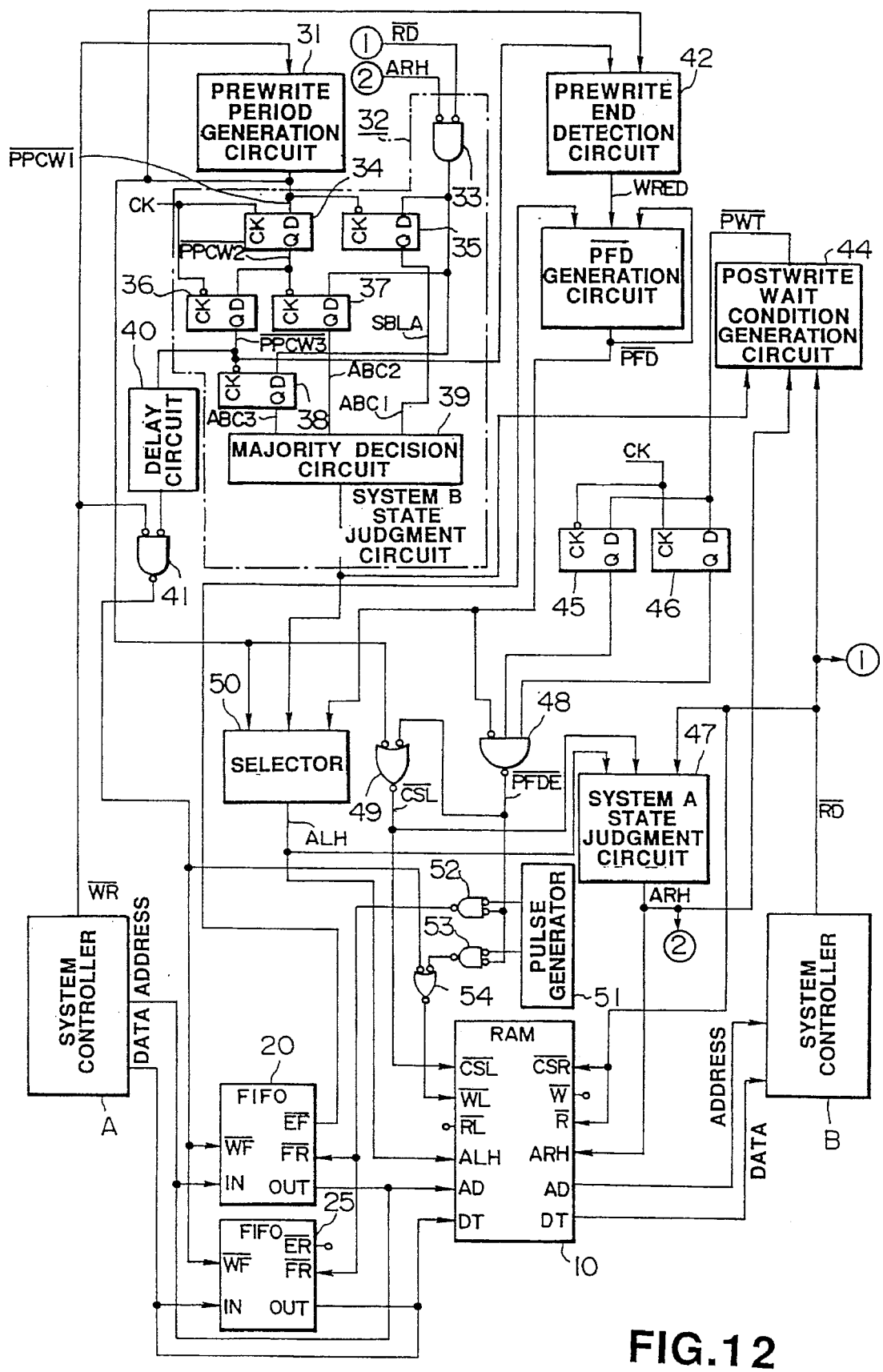
FIG. 12 is a detailed block diagram of an arrangement of an internal circuit of a system of the third embodiment.

Shown in FIG. 11 is a conceptional arrangement of a third embodiment of the present invention, and shown in FIG. 12 is a specific example of the arrangement of FIG. 11.

In FIGS. 11 and 12, the system controllers A and B are installed, for example, in an industrial machine. In the illustrated example, the system controller (which will be abbreviated to the controller, hereinafter) A, which is a master controller for performing general control over the entire industrial machine, has an ordinary computer configuration including a CPU and a memory. Meanwhile, the system controller B performs data transfer with sensors or actuators installed in various parts of the industrial machine.

The arrangement of FIG. 11 is intended to transmit data from the controller A to the controller B. And it is also assumed that, with respect to the memory access period of the controllers A and B, a non-access time Td (in the illustrated example, non-write time) of the controller A to the memory is set to be longer than a memory access period TB (in the illustrated example, read time) of the controller B to the memory.

More precisely, the following relationship is assumed to be satisfied.

Non-access time TNA of system A>Time Td necessary for postwriting+Access time TB of system B (refer to FIG. 14(a) and (j)).

The postwriting operation will be explained later.

In this case, the system control A is operated based on a system clock CKA while the controller B is operated based on a clock CKB. These clocks CKA and CKB are set to be completely different from each other with respect to their period, phase, etc.

The memory 10 comprises a dual port RAM which can be accessed from both of the controllers A and B for its writing/reading operation. In the illustrated example, the memory area of the dual port memory is divided into two zones H and L which are selected by whether the uppermost bit ALH or ARH of an address of the dual port memory is H or L. More specifically, when the dual port memory is accessed from the controller A, the uppermost bit ALH is set to be H or L, so that the zone H or L is selected; whereas, when the dual port memory is accessed from the controller B, the uppermost bit ARH is set to be H or L, so that the zone H or L is selected. That is, in this case, the memory 10 has a so-called duplex structure and eventually exactly the same data is written in the zones H and L of the memory 10 for each write period of the controller A under such control of a control logic 30 as will be explained later. In this case, since data transmission is assumed to be carried out only in one direction from the controller A to the controller B as mentioned earlier, the controller A performs only its writing operation while the controller B performs only its reading operation.

Provided between the controller A and the memory 10 is a buffer circuit 20 which, when it is desired to write data from the controller A to the memory. 10, temporarily stores therein output data DT and an address AD of the controller A and thereafter which outputs the temporarily stored data to either one of the zones H and L of the memory 10 according to the signal received from the control logic 30. In the illustrated example, the buffer circuit comprises two first-in-first-out circuits (FIFOs) 20 and 25. In more detail, the FIFO 20 stores therein the address from the controller A, while the FIFO 25 stores therein the data from the controller.

Prior to explanation of the internal structure of the control logic 30, explanation will be directed to the input/output terminals of the memory 10 and FIFOs 20 and 25.

CSL__: Chip select terminal from the left side (control A) of the memory 10

CSR__: Chip select terminal from the right side (control B) of the memory 10

WL__: Write enable signal of the memory 10

R__: Read enable signal of the memory 10

ALH: Uppermost address bit of the memory 10 and also refers to a signal for division of the memory 10 into the zones H and L from the left side controller A)

ARH: Uppermost address bit of the memory 10 and also refers to a signal for division of the memory 10 into the zones H and L from the right side (controller B)

AD: Address signal

DT: Data

WF__: Write enable signal of FIFOs

EF__: Data empty flag issued from the FIFO (H when there is storage data in the FIFO and L all the storage data area read out from the FIFO)

FR__: Read enable signal of the FIFOs

IN: Data input terminals of the FIFOs

OUT: Data output terminals of the FIFOs

The control logic 30, which is connected to control buses CB of the controllers A and B as shown in FIG. 11 (more precisely, which receives a write request signal WR__ from the controller A and a read request signal RD__ from the controller B), controls the writing/reading operation of the memory 10 and FIFOs 20, 25. More specifically, the control logic 30 includes a plurality of circuits 31 to 45 as shown in FIG. 12. The plurality of circuits of the control logic 30 forms its control logic configuration in the form of hardware including flip-flops and logical gates.

Prior to explanation of the respective structures of the circuits of the control logic 30, explanation will be briefly made as to the logical configuration of the control of the writing/reading operation of the control logic 30 over the memory 10 and FIFOs 20, 25.

(1) First, with respect to the writing/reading operation of the memory 10, the zone L is set to be higher in priority than the zone H.

(2) When the write request signal WR__ is issued from the controller A, two writing operations are carried out as shifted in writing time to the memory 10, so that the same data is written in the zones H and L of the memory 10.

In the first writing operation (which will be referred to as the prewriting operation, hereinafter), the data is written both in either one of the zones H and L of the memory 10 and in the FIFO 25 at the same time, while the address is written in the FIFO 20. The selection of the zones L and H of the memory 10 is determined by the state of the controller B at the time of starting sending the signal WR__ from the controller A. If the controller B is already accessing either one of the zones L and H of the memory 10 for reading operation, writing operation of the controller A is carried out for the opposite zone; while, if the controller B is not accessing the memory 10, writing operation is carried out for the zone L having a higher priority.

In the second writing operation (which will be referred to as the post-writing operation, hereinafter), the data written in the FIFO 25 and the address in the FIFO 20 in the above prewriting operation are read out from the FIFOs 25 and 20 after completion of the prewriting operation, and the data read out from the FIFO 25 is written into the zone H or L of the memory 10 opposite to the zone selected in the prewriting operation according to the address issued from the FIFO 20. At the time of starting the post-writing operation, if the controller B is accessing the zone into which the data from the FIFO 25 is to be written, the controller A waits for the access completion of the controller B, after which the postwriting is carried out.

(3) When the read request signal RD_ (L state during the read period) is issued from the controller B, the state of the controller A at the time of starting sending the signal RD_ is judged. If the controller A is already accessing the memory 10 at the judgment time to write either one of the zones H and L, reading operation is carried out from the opposite zone, while, if the controller A is not accessing the memory 10, reading operation is carried out from the zone L having a higher priority.

(4) When it is desired to judge the state of the party controller, the following method is employed to prevent the simultaneous accessing of the both controllers to the same zone of the memory 10 which may occur when the states of the party controllers are judged at the same time.

That is, when the controller A performs the prewriting operation, the judging operation for selection of the zone H or L to be accessed by its own controller A on the basis of the status judgment of the party controller B is carried out for a plurality of times as shifted in time, for example, three times. And the zone to be actually accessed by the controller A is decided by the decision of majority between the judgment results at these 3 different time points.

For example, when the judgment results at the three different time points are H, L and L (H: selects the zone H, L: selects the zone L), L is selected by the majority decision and thus the controller A accesses the zone L. When the three judgment results are L, H and H, the majority decision therebetween results in H and thus the controller A accesses the zone H. The major decision between the three judgment results means that the major decision result cannot be obtained only with use of the first judgment result and can be obtained with use of at least two judgment results.

In other words, the access zone of the controller A in the prewriting operation is determined after at least two time judgment results have been obtained.

The above majority decision result is used as a flag signal indicative of the memory access state of the controller A in the judgment of the status of the party controller A during the reading operation of the controller B. The flag signal, after the first judgment result is obtained, has a state corresponding to the first judgment result.

In the reading operation of the controller B over the memory 10, the state of the controller A is judged only once at the time of starting sending the read request signal RD_ on the basis of the aforementioned flag signal and the memory zone to be accessed by its own controller B is determined based on the judgment. When the read request signal RD_ is started at the time of the first one of the decision results at the three different time points, it is set for the controller B to access the priority zone L as the decision at exactly the same time point.

The logic of the control logic 30 has been briefly explained in the foregoing. Next explanation will be made as to the operation of the arrangement of FIG. 11 by referring to timing charts of FIGS. 13 to 15.

Figure 13:
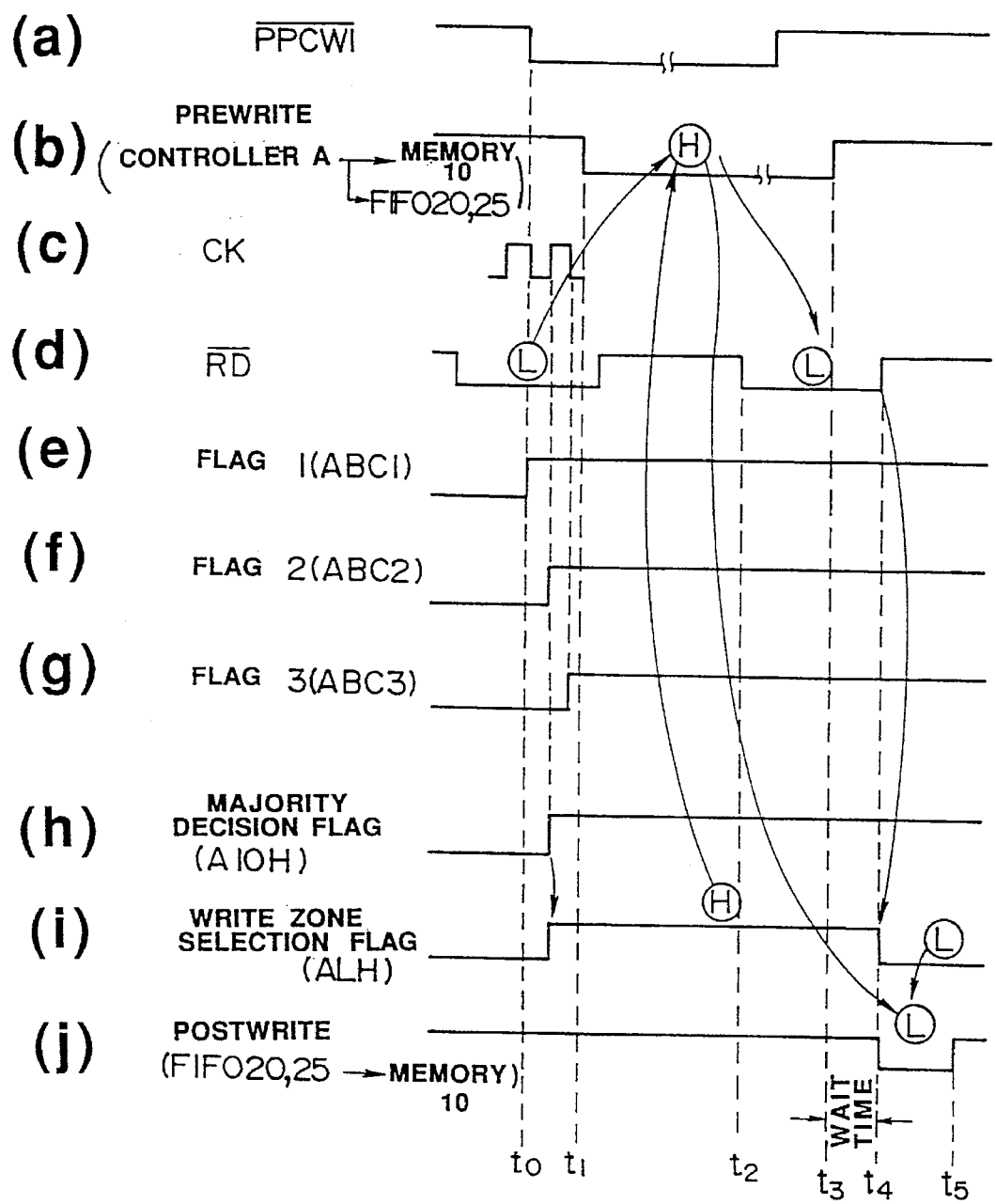
FIGS. 13 to 15 are timing charts conceptionally showing the operation of the system of the third embodiment.
Figure 14:
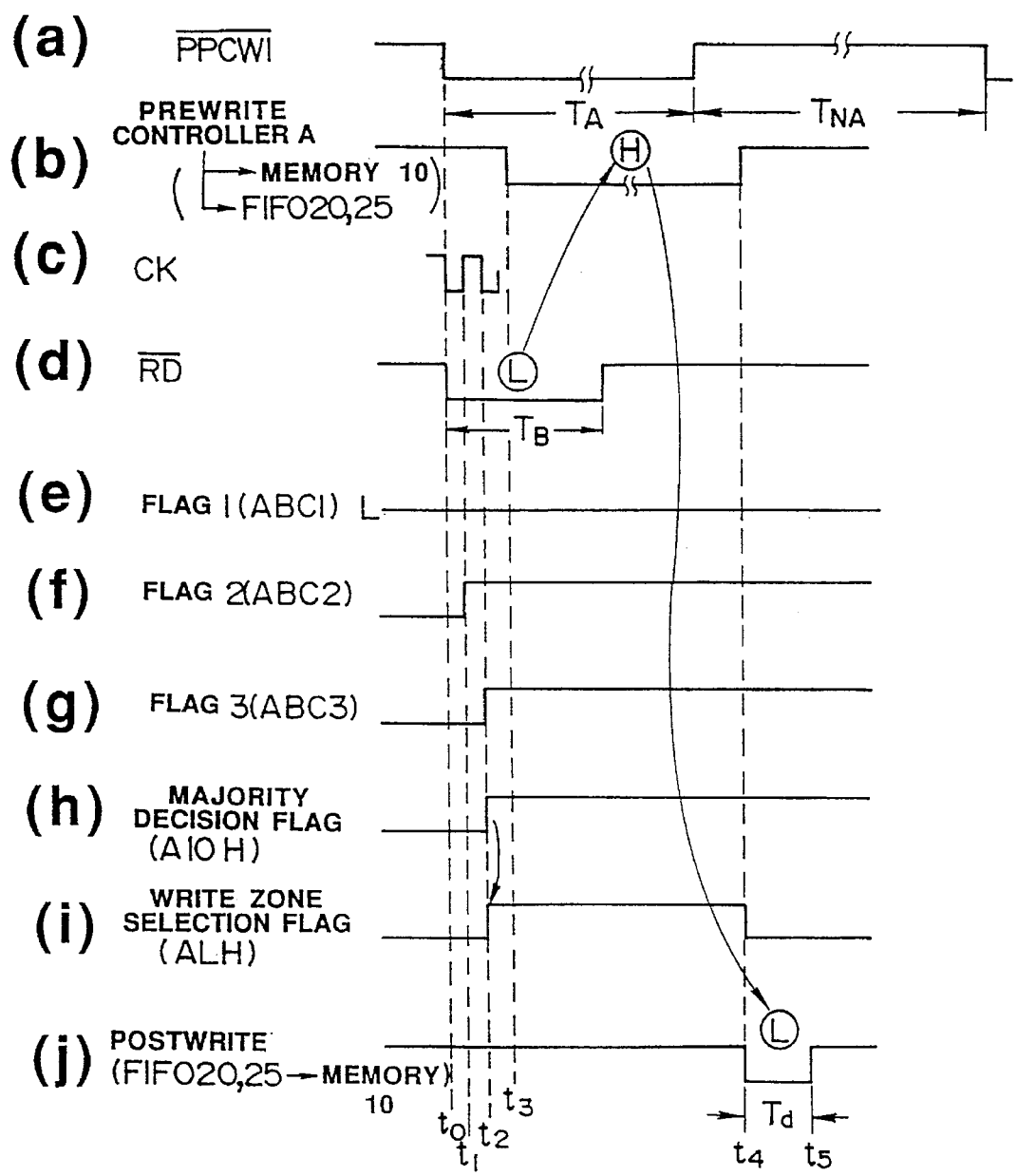
Figure 15:
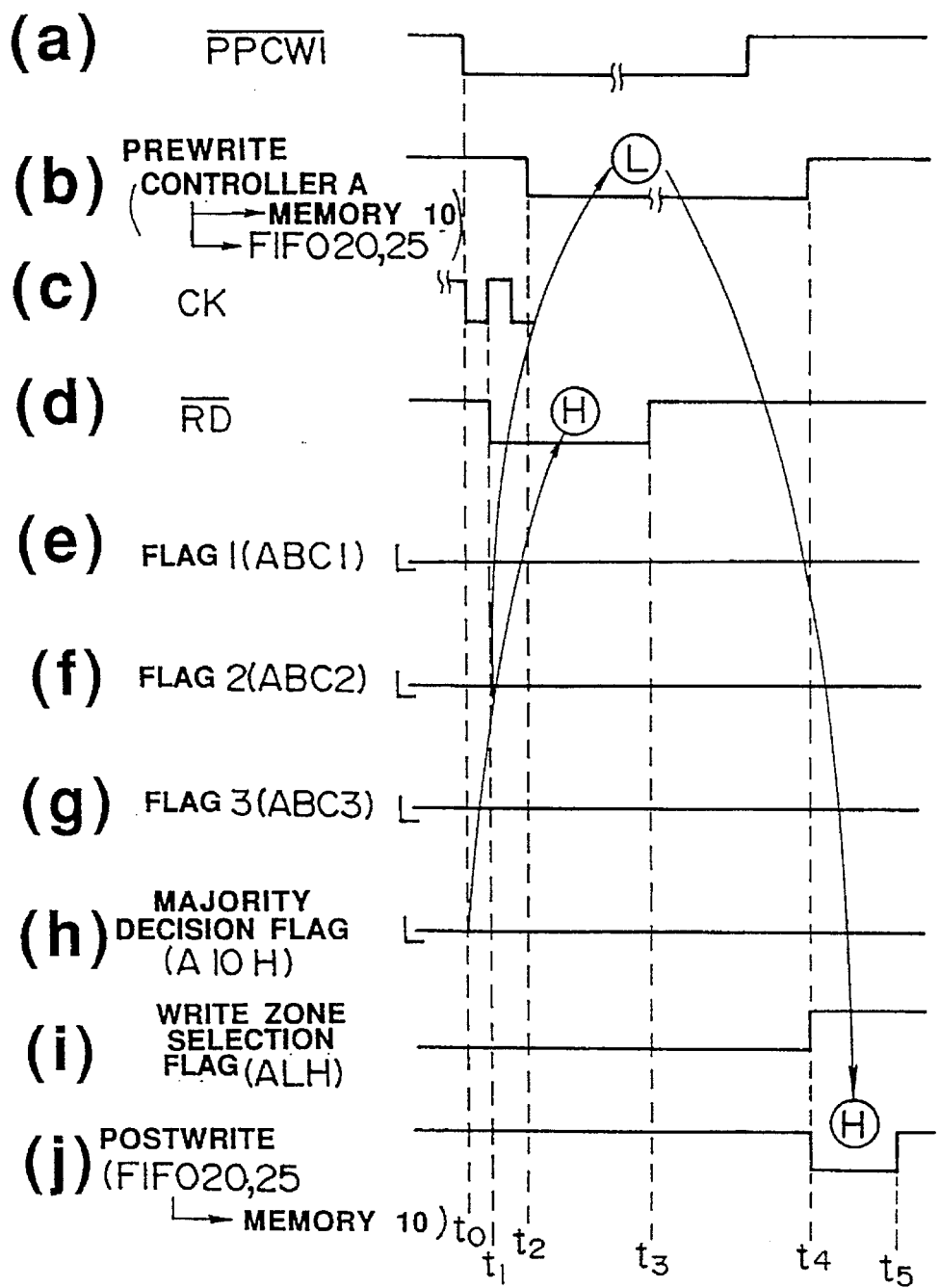

In FIGS. 13 to 15, (a) shows a prewriting duration of a signal PPCW1_ generated from the write request signal WR_ issued from the controller A; (b) shows a prewriting duration corresponding to the prewriting duration of the signal PPCW1_ delayed by the delay circuit 40; (c) shows the clock signal ck; (d) shows the read request signal RD_ issued from the controller B and its read duration; (e) shows a flag signal set based on the decision of the state of the party controller B when the signal WR_ falls; (f) shows a flag signal set after half the clock ck when the signal WR_ falls; (g) shows a flag signal set after one clock ck when the signal WR_ falls; (h) shows a flag signal indicative of a majority decision between the flags 1 to 3; (i) shows a flag signal for determining the memory zone in the prewriting operation and in the postwriting operation; and (j) shows a postwriting duration.

The flags 1 to 3 of (e) to (g) indicate results the decision for selection of the memory zone to be accessed by its own controller A is carried out on the basis of the status decision of the party controller B in the prewriting operation at the three different time points as mentioned above. In FIGS. 13 to 15, with regard to the signals other than the flag signals, symbol L denotes 'active' and H and L given above these signals denote the zones H and L of the memory 10 selected respectively.

FIG. 13 shows a state when the controller 13 is already accessing the memory 10 at the time of starting the prewriting operation.

In FIG. 13, at a time t0, since the controller B is accessing the zone L of the memory 10, the zone H is selected as the zone to be accessed from the controller A. As a result, during a period between the time t1 and time t3, the data of the controller A is written in the zone H of the memory 10 and the data and address of the controller A are written in the FIFOs 25 and 20, whereby the prewriting operation is carried out. In the reading operation of the controller B in a period between the time t2 and t4, since the zone H of the memory 10 is occupied by the controller A at the time t2, the zone L is selected as the access zone of the controller B.

Then, at the time t3 at which the prewriting operation of the controller A is completed, the zone L (opposite to the zone in the prewriting operation) for the postwriting operation is occupied by the controller B. Accordingly, the control logic 30 waits for the access completion of the controller B and from the completion time (time t4), starts the postwriting operation. It takes a time Td in the postwriting operation. The postwriting operation is completed at the time t5.

FIG. 14 shows a state when the falling of the signal PPCW1_ (which will be explained later) generated from the signal WR_ of the controller A and the falling of the signal RD_ of the controller B take place at the same time (time t0). In this case, the party statuses are judged at the same time, at which time the controller B which performs only one decision judges that the signal PPCW1_ indicative of the access of the controller A is in the H state (not accessing), which results in that the priority zone L is selected.

Accordingly, from the time t0, the controller B starts to access to the zone L of the memory 10 for reading operation. Meanwhile, the flag 1, which indicates the result of the selection of the memory zone to be accessed by its own controller A based on the state of the party controller B at the time t0, remains the L state since the memory access of the party controller B to the zone L at the time t0 cannot be detected. However, since the state of the party controller B can be detected at the time t1 after half the clock, the flag 2 rises to the H state opposite to the memory access zone L of the controller B at the time t1. Similarly, the flag 3 rises to the H state at the time t2. Accordingly, the majority decision flag indicative of the result of the majority decision between the flags 1 to 3 rises to the H state at the time t2. The right zone selection flag has the same logical value as the majority decision flag in the prewriting operation and has the inverted value of the majority decision flag in the postwriting operation. Therefore, the data issued from the controller A is written in the zone H of the memory 0 (times t3 to t4). Of course, in the prewriting period between the time t3 and t4, the data and address of the controller A are written in the FIFOs 25 and 20. At the time t4 at which the prewriting operation of the controller A is completed, the controller B is not accessing the zone L to be subjected to the postwriting operation. Therefore, in this case, the postwriting operation is carried out immediately after the time t4 without any wait time.

FIG. 15 shows a state when the falling of the signal RD__ of the controller B occurs at the same time as half the clock after the falling of the signal WR__ (more precisely, the signal PPCW1__ ) of the controller A.

At a time t0, since the controller B is not accessing the memory, the flag t is set at the priority zone L at the time t0. At a time t1 after half the clock from the time t0, the read request signal RD__ of the controller B falls to the L state, at which time the state of the party controller A is judged on the basis of the majority decision flag, the signal PPCW1__ indicative of access of the controller A and the postwriting operation. In this case, since the majority decision flag is L at the time t1 and the signal PPCW1__ is in the L state, the zone H opposite to the majority decision flag is selected as the zone to be read by the controller B, which results in that the controller B reads the zone H of the memory 10 in a period between the time t1 and t3.

At the time t1, on the other hand, since the controller B selects the zone H, the flags 2 and 3 for its judging operation maintain the L state at times t1 and t2. Thus, the majority decision flag also keeps the L states, with the result that the prewriting operation to the zone L of the memory 10 is started from a time t2. At a time t4 at which the prewriting operation of the controller A is completed, the controller B is not accessing the zone H to be subjected to the postwriting operation. Accordingly, even in this case, the postwriting operation is carried out immediately after the time t4, as in FIG. 14.

Explanation will next be made as to the structures of the circuits of the control logic 30 by referring to FIG. 12. Although the system clock signals CK are given actually in various parts, only the major system clock signals CK are input in FIG. 12 and the other clock signals are omitted.

Figure 16:
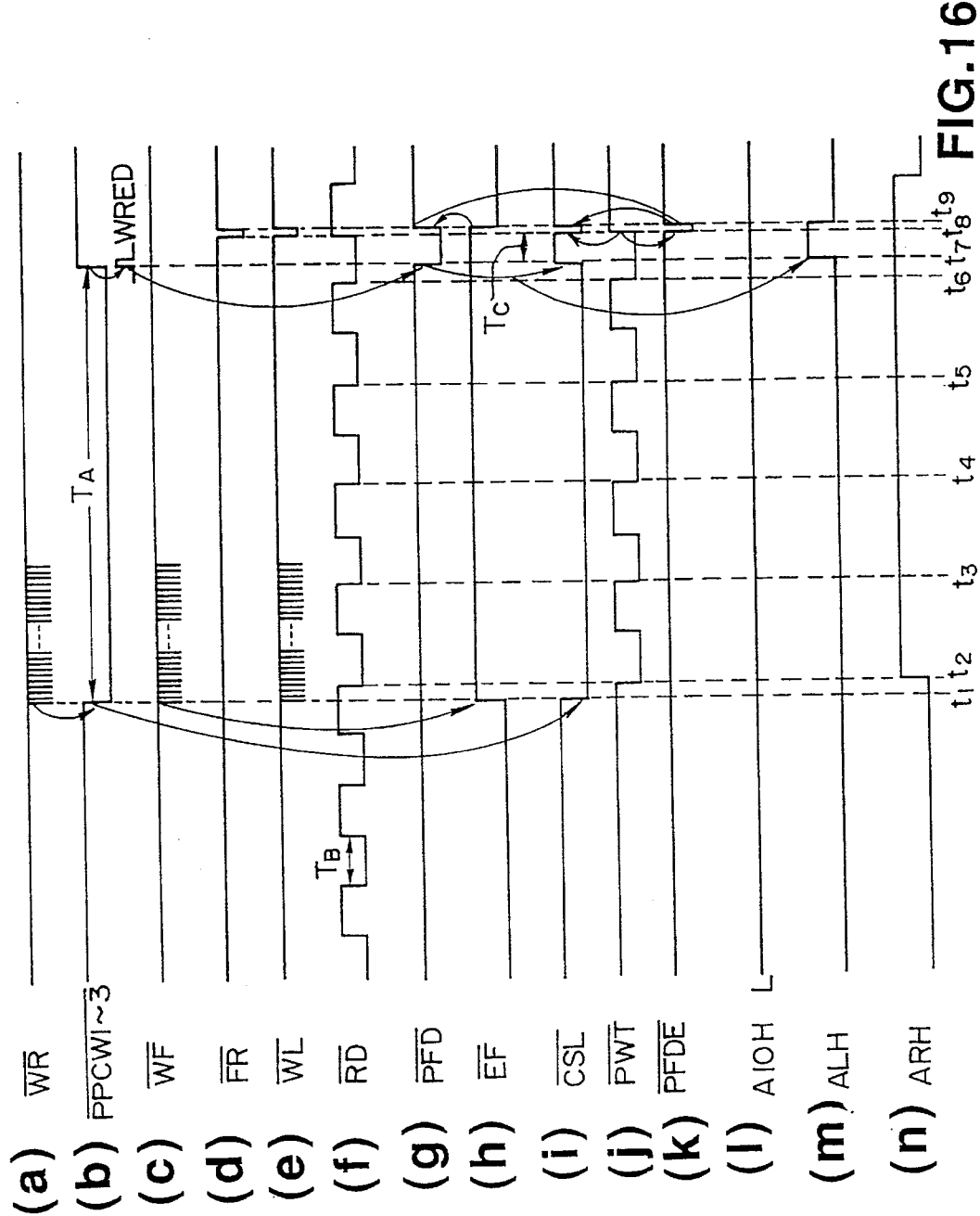
FIGS. 16 to 18 are timing charts for explaining the specific operation of the system of the third embodiment.
Figure 17:
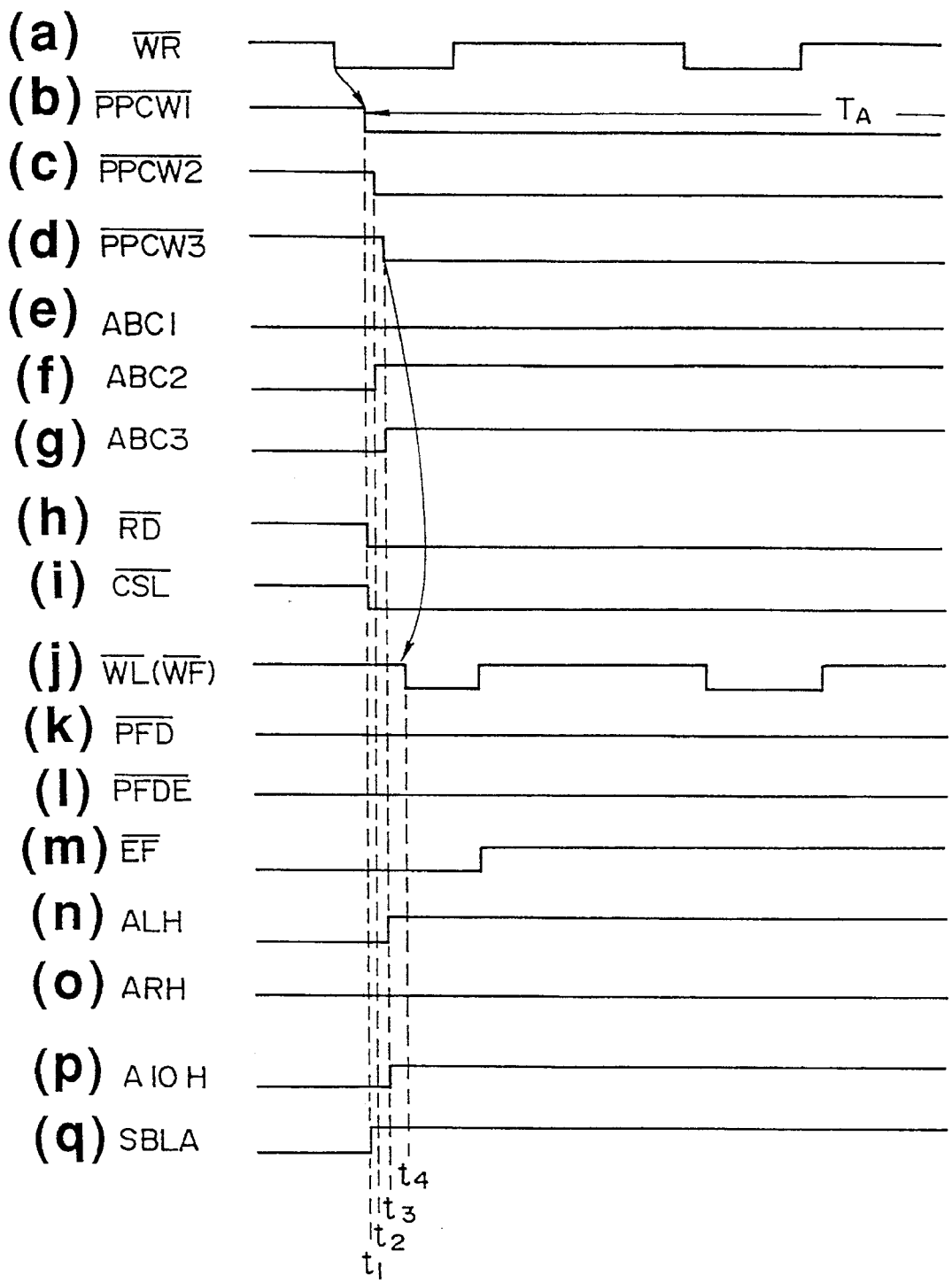

The write request signal WR__ (refer to FIGS. 16 and 17,(a)) of the controller A is input to the prewrite period generation circuit 31 and the gate 41. The pulse period of the system clock signal CK is sufficiently shorter than the pulse width of the write request signal WR__

The postwriting period generation circuit 31, which is made up of a one-shot multivibrator, a flip- flop or the like, receives the write request signal WR__ at the timing of the falling edge of the system clock signal CK and thereafter generates the signal PPCW1__ having an L state kept for a predetermined time TA and outputs it (refer to FIG. 17(b)). That is, the signal WR__ is output from the controller A many times sequentially during one writing duration TA (refer to FIG. 16) of the controller A, in which case the signal PPCW1__ is kept to be the L state during the output of the signal WR__.

The signal PPCW1__ is input to the system B state decision circuit 32.

The system B state decision circuit 32 comprises a gate 33, 5 D type flip-flops 34 to 38 and a majority decision circuit 39. The flip-flop 34, when receiving the signal PPCW1__ at a terminal D, outputs a signal PPCW__ (FIG. 17(c)) corresponding to the signal PPCW1__ delayed by half period (half clock) of the clock signal CK. The flip-flop 36, when receiving the signal PPCW2__, outputs a signal PPCW3__ (FIG. 17(d)) corresponding to the signal PPCW2__ delayed by one period (one clock) of the clock signal CK. That is, the signals PPCW2__ and PPCW3 correspond to the signal PPCW1__ delayed by a half clock and one clock respectively, and the signals PPCW1__, PPCW2__ and PPCW3__ are input to the clock terminals of the flip-flops 35, 37 and 38 respectively. An output SBLA of the gate 33 is input to the terminals D of these flip-flops 35, 37 and 38.

The gate 33 performs an AND operation of an inversion of the read request signal RD__ of the system controller B and an inversion of the output ARH of the system A state judgment circuit 47, judges the state of the system B, determines the selection of the controller A of the zone H or L of the memory 10 on the basis of the judgment result, and outputs the signal SBLA. The signal SBLA is used as judgment means for determining the selection of the memory 10 of the zone H or L of the memory 10.

The signal ARH indicates the selection of the controller B of the zone H or L and the logic configuration for outputting the signal ARH will be detailed later. When the signal ARH is in the H state, the zone H of the memory 10 is selected, while when the signal ARH is in the L state, the zone L is selected.

That is, the arrangement of the gate 33 and flip- flop 35 judges the access state of the controller B at the moment when the signal PPCW1__ falls to the L state on the basis of the states of the signals RD__ and ARH, determines the selection of the controller A the zone H or L of the memory 10 on the determination result, and outputs a signal ABC1 indicative of its determination result (FIG. 17(e)). More specifically, the signal ABC1 is determined by the states of the signals RD__ and ARH when the signal PPCW1__ falls to the L state, which true table is given in Table 4 below.

TABLE 4

| RD | ARH | ABC1 |
|---|---|---|
| H |  | L |
| L | H | L |
| L | L | H |

The signals RD__ and ARH denote states when the signal PPCW1__ falls to the L state.

More specifically, as mentioned above, the zone L of the memory 10 is set to be higher in priority than the zone H. For this reason, when the signal RD__ is in the H state at the time of starting the prewriting operation, that is, when the controller B is in the non-access state, the signal ABC1 is in the L state corresponding to the priority zone (zone L) of the memory 10. When the signal RD__ is in the L state at the time of starting the prewriting operation, that is, when the controller B is in the access state, the signal ABC1 has the state opposite to the signal ARH, whereby the zone opposite to the zone accessed by the controller B is selected.

The flip-flop 37 latches an output SBLA of the gate 33 at the falling timing of the signal PPCW2, that is, after half clock from the falling timing of the signal PPCW1__ and outputs a signal ABC2 (FIG. 17(f)). The flip-flop 38 latches an output SBLA of the gate 33 at the falling timing of the signal PPCW2, that is, after one clock from the falling timing of the signal PPCW1__ and outputs a signal ABC3 (FIG. 17(g)).

In other words, the flip-flops 35, 37 and 38 latch the output of the gate 33 at three different time points at time points sequentially shifted by half clock to judge the state of the controller B three times at different time points and to output the flag signals ABC1, ABC2 and ABC3 indicative of the memory zone (H or L) to be selected by the controller A on the basis of the judgment results.

The flag signals ABC1 to ABC3 are input to the majority decision circuit 39 which performs majority deciding operation between these flag signals. More specifically, the majority decision circuit 39 performs the majority deciding operation between the input signals ABC1 to ABC3 at the respective time points and outputs its majority decision result A10H (FIGS. 16(*l*), FIG. 17(*p*)). That is, when the signals ABC1 to ABC3 at a time point are L, L and H in their state, the output A10H of the majority decision circuit 39 is in the L state; when the signals ABC1 to ABC3 at a time point are L, H and L in their state, the output A10H of the majority decision circuit 39 is in the L state; and when the signals ABC1 to ABC3 are H, H and L, the output A10H is in the H state.

On the other hand, the signal PPCW3_ is applied to a delay circuit 40 which delays the input signal by a time corresponding to several clocks CK and outputs its delayed output to a gate 41. The gate 41 performs a NAND operation of the signal WR_ and an inversion of the delayed output of the signal PPCW3_ and applies its NANDed output to the terminals WF_ of the FIFOs 20 and 25 (FIG. 16(*e*), FIG. 17(*j*)). As already explained above, the pulse period of the system clock CK is set to be sufficiently shorter than the pulse width of the signal WR_. For this reason, since the output of the delay circuit 40 corresponding to the signal WR_ delayed by an amount of several clocks as well as the signal WR_ are input to the gate 41, the first-time pulse in the signal WR_ will not be canceled (refer to FIG. 17). The delay circuit 40 is used to extend the time until the output of a selector 50 is input to the terminal ALH in the prewriting operation. The FIFOs 20 and 25, when receiving the L state signal at the terminals WF_, write the address and data signals issued from the controller A into the memory areas of the FIFOs 20 and 25.

A prewrite end detection circuit 42 receives the signals PPCW1_ and PPCW3_ and prescribes its prewrite end time on the basis of these input signals. In this case, a time between the rising timing of the signal PPCW1_ and the rising timing of the signal PPCW3_, i.e., the rising timing of the signal PPCW2_ is set to be the prewrite end time, at which time the prewrite end detection circuit 42 outputs the prewrite end signal WRED.

The PFD_ generation circuit 43, which comprises a plurality of logical gates, flip-flops, etc., receives the signal EF_ from the FIFO 20, the signal WRED and a feedback signal. As has been already explained, the signal EF_ (refer to FIG. 16(*h*), FIG. 17(*m*)) is an empty flag for the FIFO 20 and is at the H state during the aforementioned prewriting and postwriting operation. The PFD generation circuit 43 generates a signal PFD_ which falls at the timing of the rising edge of the signal WRED, i.e., the rising edge of the signal PPCW2_ and rises at the timing of the falling edge of the signal EF_. In other words, the signal PFD_ is at the L state from the end of the prewriting operation until the end of the postwriting operation.

The selector 50 switches between the signal A10H and its inverted signal according to the states of the signals PPCW1_ and PFD_ and outputs it as the signal ALH. In more detail, as the output ALH, the non-inverted output of the signal A10H is selected when the signal PPCW1_ is in the L state (nearly in the prewriting operation), the inverted signal of the signal A10H is selected when the signal PFD_ is in the L state (from the prewrite end time until the postwrite end time), and the L is selected corresponding to the priority zone of the memory 10 when the signals PPCW1_ and PFD_ are in the H state. In other words, the selector 50 is designed to select, in the postwriting operation, the zone opposite to the zone in the prewriting operation. The signal ALH issued from the selector 50 is input to the terminal ALH of the memory 10 for selection of the zone H or L.

Next, the read request signal RD issued from the controller B is input directly to the terminals CSR_ and R_ of the memory 10. Accordingly, during the L period of the signal RD_, the storage data is necessarily read out from either one of the zones H and L. In other words, there is no wait time for the reading operation. The selection of the zone H or L in reading operation is determined by a signal ARH (refer to FIG. 16(*n*) and FIG. 17(*o*)) issued from the system A state judgment circuit 47. The logical configuration (which will be also detailed later) of the system A state judgment circuit 47 will now be briefly explained. That is, the output ARH of the judgment circuit 47 is determined by the states of the signals CSL_ and ALH when the signal RD_ falls to the L state, which true table is given in Table 5 below.

TABLE 5

| CSL | ALH | ARH |
|-----|-----|-----|
| H   |     | L   |
| L   | H   | L   |
| L   | L   | H   |

The signals CSL_ and ALH show the states when the signal RD_ falls to the L state.

And when the signal ARH is in the H state, the zone H of the memory 10 is selected; while the signal ARH is in the L state, the zone L of the memory 10 is selected.

The postwrite wait condition generation circuit 44 generates part of conditions under which the postwriting operation from the FIFOs 20 and 25 to the memory 10 is awaited by the access of the controller B to the memory 10. The condition generation circuit 44 receives the signals RD_, ARH and A10H and outputs a signal PWT_ (refer to FIG. 16(*j*)). The signal PWT_ is changed to the L state when the wait conditions given in Table 6 below are satisfied.

TABLE 6

| RD | A10H | ARH | PWT |
|----|------|-----|-----|
| L  | H    | L   | L   |
| L  | L    | H   | L   |
|    | Otherwise |  | H   |

Since the inverted signal of the signal A10H indicates the memory zone of the postwriting operation in Table 6, when the signals A10H and ARH (access zone of the controller B) coincide with each other and the signal RD_ is in the L state (in the access state of the controller B), the signal PWT_ is changed to the L state because the postwriting operation must be awaited.

The signal PWT_ is input to terminals D of flip-flops 45 and 46. An inverted signal of the system clock CK is input to the clock terminal of the flip-flop 45 and the non-inverted signal of the system clock CK is input to the clock terminal of the flip-flop 46, so that the flip-flops 45 and 46 latch the signal PWT_ two times at timings shifted by half of one clock CK and apply their outputs to a gate 48.

The gate 48 performs an AND operation of an inverted signal of the signal PFD_ and the outputs of the flip-flops 45 and 46 and outputs the inverted signal as a signal PFDE_

(refer to FIG. 16(k) and FIG. 17(l)). That is, the gate 48 generates and outputs the signal PFDE__ which has the L state only during the postwriting operation.

The signal PFDE__ is input to gates 49, 52 and 53. The gate 49 performs a NOR operation of an inverted signal of the signal PFDE__ and an inverted signal of the signal PPCW1__ and inputs its NORed output CSL__ to the terminal CSL__ of the memory 10. In other words, the gate 49 outputs the signal CSL__ which is L in the prewriting operation (PPCW1__) and the postwriting operation (PFDE__), at which time the chip selection is carried out from the left side of the memory 10.

The signal CSL__ is also input to the system A state judgment circuit 47. The judgment circuit 47 judges the access state of the controller A at the moment the signal RD__ falls to the L state on the basis of the received signals CSL__ and ALH, determines the selection of the controller B of the zone H or L of the memory 10 on the basis of the judgment result, and outputs the signal ARH indicative of the selection result (refer to FIG. 16(n)), which true table is given in Table 5 above. The signal ARH, like the signal ALH, when in the H state, selects the zone H of the memory 10; whereas, when in the L state, selects the zone L of the memory 10.

This system A state judgment circuit 47 is arranged so that, as also shown in Table 5, the zone L is set to be higher in priority so that, when determining the controller A is in the non-access state at the falling edge of the signal RD__ (H in the signal CSL__), access is made to the zone L. Accordingly, the falling timing of the read request signal RD__ from the controller B and the start of the postwriting operation take place at the same time in the postwriting operation of the controller A over the zone L, the reading and the postwriting operation over the same zone L might take place. In order to avoid such a situation, the two flip-flops 45 and 46 are provided to shift the signal PWT__ with respect to time to latch the two and input the latch signals to the gate 48.

Input to the gate 52 and 53 from a pulse generator 51 are pulse signals which are somewhat shifted in phase so that the passage or blockage of the pulse signals are switched by the signal PFDE__ applied to the other terminals of the gate 52 and 53. That is, when the signal PFDE__ is in the L state, the pulse outputs from the pulse generator 51 are output from the respective gates 52 and 53.

The pulse signal passed through the gate 52 is input to the terminals FR__ of the FIFOs 20 and 25 (refer to FIG. 16(d)). Accordingly, the address and data already stored in the FIFOs 20 and 25 in the prewriting operation are output therefrom according to the output pulse of the pulse generator 51 when the signal PFDE__ becomes the L state. The address issued from the FIFO 20 is input to the terminal AD of the memory 10, while the data issued from the FIFO 25 is input to the terminal DT of the memory 10.

Meanwhile, the pulse signal passed through the gate 53 is input to the gate 54. The gate 54 performs an NOR operation of the output of the gate 41 and the output of the gate 53 and inputs its NORed output to the terminal WL__ of the memory 10. That is, the gate 54 performs its NOR operation of the output of the gate 41 indicative of the prewriting state and the output of the gate 53 indicative of the in-postwriting state, and inputs a pulse train necessary for the postwriting operation to the terminal WL__ of the memory 10.

In this case, since the postwriting operation is based on the control of the outputs of the FIFOs 20 and 25, the length of the postwriting operation (PFDE__) is set to be much shorter than in the prewriting operation (PPCW1__ to PPCW3__) so that a pulse signal having pulses corresponding in number to the signal WR__ during the L state of the signal PFDE__. This is because the signal PFDE__ is changed to the H state by the signal EF__ issued from the FIFO, the prewriting end detection signal WRED and the postwriting wait condition signal PWT__ to always mask the pulse received from the pulse generator 42. The pulse generator also controls the phase and duty of the pulses which is to be sent to the gates 43 and 44 and which form the base of the signal WL__ of the memory 10.

The arrangement of the control logic 30 has been explained in the foregoing.

Next, explanation will be made as to the entire operation of the control logic 30 by referring to a timing chart of FIG. 16. The operational explanation of FIG. 16 is not necessarily strict with respect to time.

At a time t1, the first signal WR__ is output from the controller A (FIG. 16(a)). The prewrite period generation circuit 31 triggers the L state of the first-time signal WR__ at the falling edge of the clock CK and thereafter outputs the signal PPCW1__ which keeps the L state for a predetermined time TA. The signal PPCW1__ is delayed by one clock by the flip-flops 34 and 36 and further delayed by an amount corresponding to several clocks by the delay circuit 40 and then input to the gate 41. The gate 41 also receives the signal WR__. The output of the gate 41 is input to the terminals WF__ of the FIFOs 20 and 25 and also input to the terminal WL__ of the memory 10 through the gate 54 (refer to FIG. 16(c) and (e)). The signals WF__ and WL__ denote write enable terminals respectively. Substantially at the same time (nearly at the time t1), the signal PPCW1__ is input to the terminal CSL__ of the memory 10 through the gate 49 (FIG. 16(d)) to enable the chip selection from the left side.

Simultaneously with it, the system B state judgment circuit 36 judges the state of the controller B by majority decision on the basis of the states of the signals RD__ and ARH at the time that the signals PPCW1__ to PPCW3__ falls, and outputs the signal indicative of the selection of either one of the zones H and L of the memory 10 on the basis of the judgment result. In this case, since the signal RD__ is in the H state and the signal ARH is in the L state nearly at the time t1, the signal A10H is changed to the L state to select the priority zone L. The signal A10H is input to the terminal ALH of the memory 10 through the selector 50. As a result, in a period between the time t1 and t7, the data of the controller A is written in the zone L of the memory 10 in synchronism with the signal WR__ of the system controller A, the address of the controller A is written in the FIFO 20, and further the data of the controller A is written in the FIFO 25, whereby the prewriting operation is executed.

Even during the prewriting operation, the accessing operation (reading operation) of the controller B is being carried out, so that the system A state judgment circuit 47 judges the access state of the controller A at the respective falling edges (times t2, t3, t4, t5 and t6) of the signal RD__ and on the basis of the judgment result, selects one of the zones of the memory 10 to be accessed by the controller B. In this case, since the controller A selects the zone L of the memory 10 during the prewriting operation, the zone to be accessed by the controller B becomes the zone H as also seen from the signal ARH.

Thereafter, when the prewriting operation is completed, this is detected by the prewrite end detection circuit 42 in the form of the rising edge of the signal PPCW__, and the circuit 42 outputs the signal WRED (at the time t7).

The signal WRED causes the signal PFD__ issued from the PFD__ generation circuit 43 to fall to the L state at the time t7. Since the selector 50, as already explained above, outputs the inverted signal of the signal A10H during the L state of the signal PFD__, the signal ALH becomes the H state during a period between the time t7 and t8.

In this case, the controller B is accessing the zone H (A10H) of the memory 10 to read the zone H for the postwriting operation, the postwriting operation must be await for a wait time TC. For this reason, the arrangement of the postwrite wait condition generation circuit 44, flip-flops 45 and 46, and gate 48 cause the postwriting operation to be started after the wait time TC. More specifically, the signal PFDE__ falls to the L state by the rising edge of the signal RD__ at the time t9, and at the time t9 after the time t8, the signal PFDE__ rises to the H state by the rising edge of the signal PFD__ caused by the rising edge of the signal EF__. The period between the time t8 and t9 corresponds to the postwriting operation duration, during which one output pulse of the pulse generator 42 based on the signal PFDE__ is input to the terminals FR__ (read enable) of the FIFOs 20 and 25 (FIG. 16(d)) while the other output pulse of the pulse generator 51 is input to the terminal WL__ (write enable) of the memory 10. Further, the terminal CSL__ of the memory 10 is also put in the chip selection state by the signal PFDE__.

Therefore, in a period between the time t8 and t9, the output of the FIFO 20, i.e., the address signal issued from the controller A in the prewriting operation is input to the terminal AD of the memory 10, while the output of the FIFO 25, i.e., the data issued from the controller A in the prewriting operation is input to the terminal DT of the memory 10. Further, at this time, since the terminal ALH is at H, the data issued from the controller A in the prewriting operation is eventually written in the zone H of the memory 10. And as a result of the postwriting operation, the storage contents of the zone L of the memory 10 becomes exactly the same as that of the zone H.

FIG. 17 shows a timing chart when the falling of the signal PPCW1__ and the falling of the signal RD__ take place at the same time and corresponding to the detailed timing chart of FIG. 14 at the time of starting the prewriting operation. That is, FIG. 17 corresponds to FIG. 16 whose time axis is largely extended. The signal RD__, as explained above, denotes the read duration of the controller B and is in the L state during the reading operation of all the data by the controller B.

In FIG. 17, the signals PPCW1__ and RD__ fall substantially at the same time at a time t1. In this case, more precisely, the falling of the signal PPCW1__ is somewhat faster than the falling of the signal RD__.

In this case, the system A state judgment circuit 47 decides and outputs the signal ARH on the basis of the logic of Table 5 at the time t1. Since the signal CSL__ is in the H state at the time t1, the signal ARH maintains its L state. Since the falling of the signal PPCW1__ is somewhat faster than the falling of the signal RD__, the output (or signal ABC1) of the flip-flop 35 when the signal PPCW1__ falls, has the L state based on the logic of Table 4 (H in the signal RD).

Since the signal RD__ is input directly to the terminals CSR__ and R of the memory 10, read access is started, in this case, to the zone L of the memory 10 simultaneously with the falling of the signal RD__.

At a time t2 after half clock from the falling of the signal PPCW1__, the flip-flop 37 again latches the output SBLA of the gate 33. Since the signals RD__ and ARH applied to the gate 33 are in the L state at the time t2, the signal ABC2 rises to the H state at the time t2. Similarly, the signal ABC3 rises to the H state at a time t3 after half clock CK from the time t2. Accordingly, the signal A10H indicative of the majority decision between the signals ABC1 to ABC3 rises to the H state at the time t3.

The gate 41 performs a NAND operation of an inverted signal of the signal PPCW3__ delayed by an amount corresponding to several clocks at the delay circuit 40 and an inverted signal of the signal WR__, and applies its NANDed output to terminals WF__ of the FIFOs 20 and 25 and the terminal WL__ of the memory 10. Accordingly, in this case, at a time t4 at which the inputs of the terminals WF__ and WL__ falls to the L state, the data of the controller A is written in the FIFO 25 and the memory 10 and the address of the controller A is written in the FIFO 20, whereby the prewriting operation is started. The zone for the data to be written by the controller A corresponds to the zone H opposite to the zone L corresponding to the access zone of the controller B.

In this way, with the structure of the system B state judgment circuit 32, even when the status judgment of the party controller is carried out at the same time, the access of the both the controllers A and B will not be made to the same zone. Although explanation has been made in conjunction with the case where the falling of the signal PPCW1__ is somewhat faster than the falling of the signal RD__ in the illustrated example, even when the above relationship is opposite, no collision takes place. Or even when the falling of these signals takes place at the same time, no collision also does not takes place.

Figure 18:
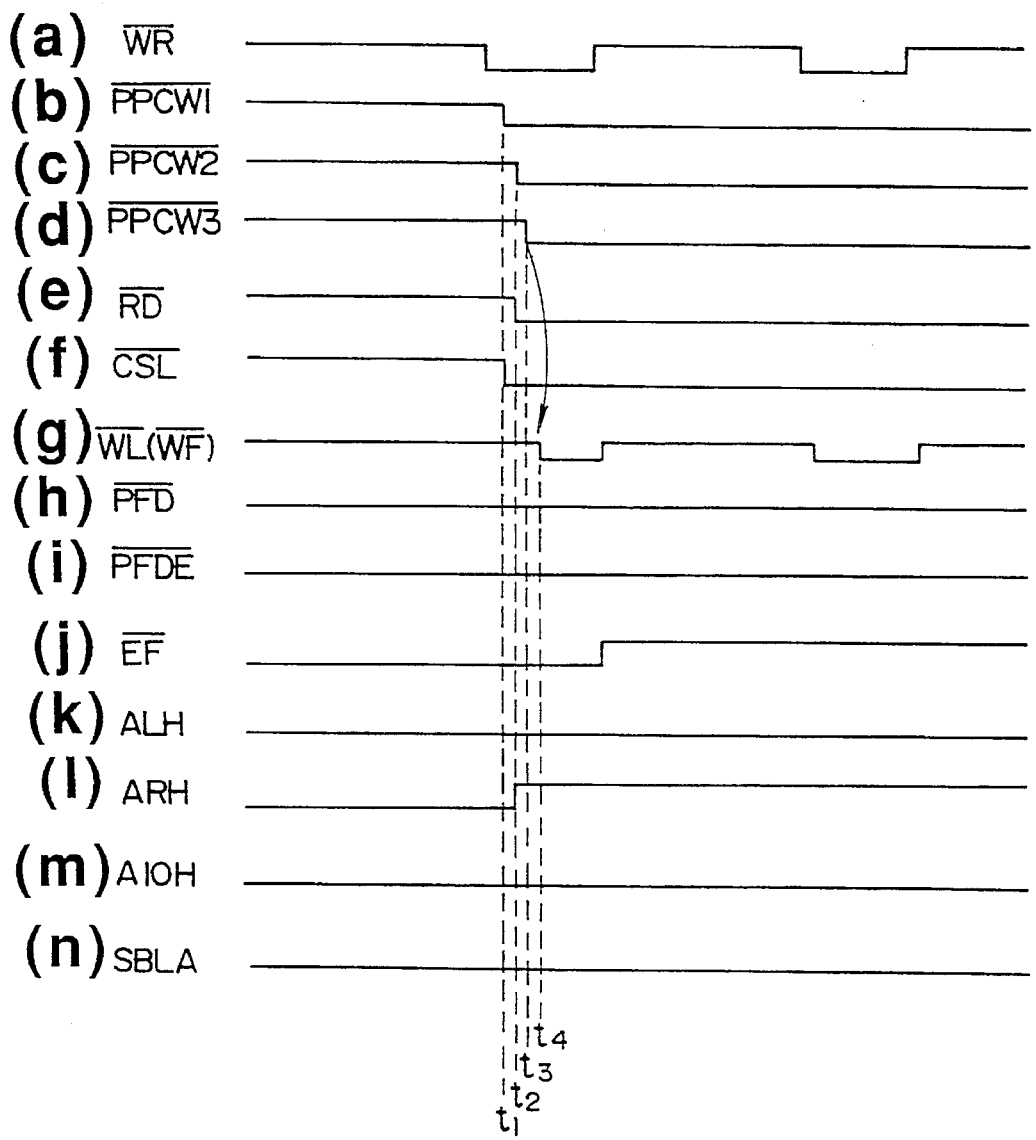

FIG. 18 shows a timing chart when the falling of the signal PPCW2__ occurs simultaneously with the falling of the signal RD__, which corresponds to the detailed timing chart of FIG. 15 in the prewriting operation.

In FIG. 18, at a time t1 at which the signal PPCW1__ falls to the L state, the signal ABC1 has the L state because the signal RD__ has the H state (refer to Table 4). Therefore, at the time t1, the signal A10H issued from the majority decision circuit also has the L state and the signal ALH also has the L state.

In response to the falling of the signal RD__ at a time t2, the system A state judgment circuit 47 judges on the basis of the signal ALH that the party controller A is accessing the zone L and makes the signal ARH to rise to the H state. As a result, read access of the controller B is started to the zone H of the memory 10 simultaneously with the falling of the signal RD__ at the time t2.

The system B state judgment circuit 32 judges the stake of the party controller B even at a time t3 after half clock from the time t2 half clock later from the falling of the signal PPCW1__, and outputs the signals ABC2 and ABC3 indicative of the memory zone to be selected by its own controller A. In this case, the signal RD__ has the H state (the controller B being not accessing) before the time t2 or the controller B already starts its actual read accessing operation to the zone H of the memory after the time t2. For this reason, the signals ABC2 and ABC3 also maintain the L state, which results in that the signals A10H and ALH maintain the L state.

The terminal WL__ of the memory 10 and the terminals WF__ of the FIFOs 20 and 25 fall to the L state at a time t4 after a Predetermined time from the falling (time t3) of the signal PPCW3__.

As a result, from the time t4, the data of the controller A is written in the zone L of the memory 10 and in the FIFO 25, while the address of the controller A is written in the FIFO 20. In this way, even when the falling of the signal RD__ takes place simultaneously with the falling of the signal PPCW__, the collision of the memory access zone can be reliably avoided.

Figure 19:
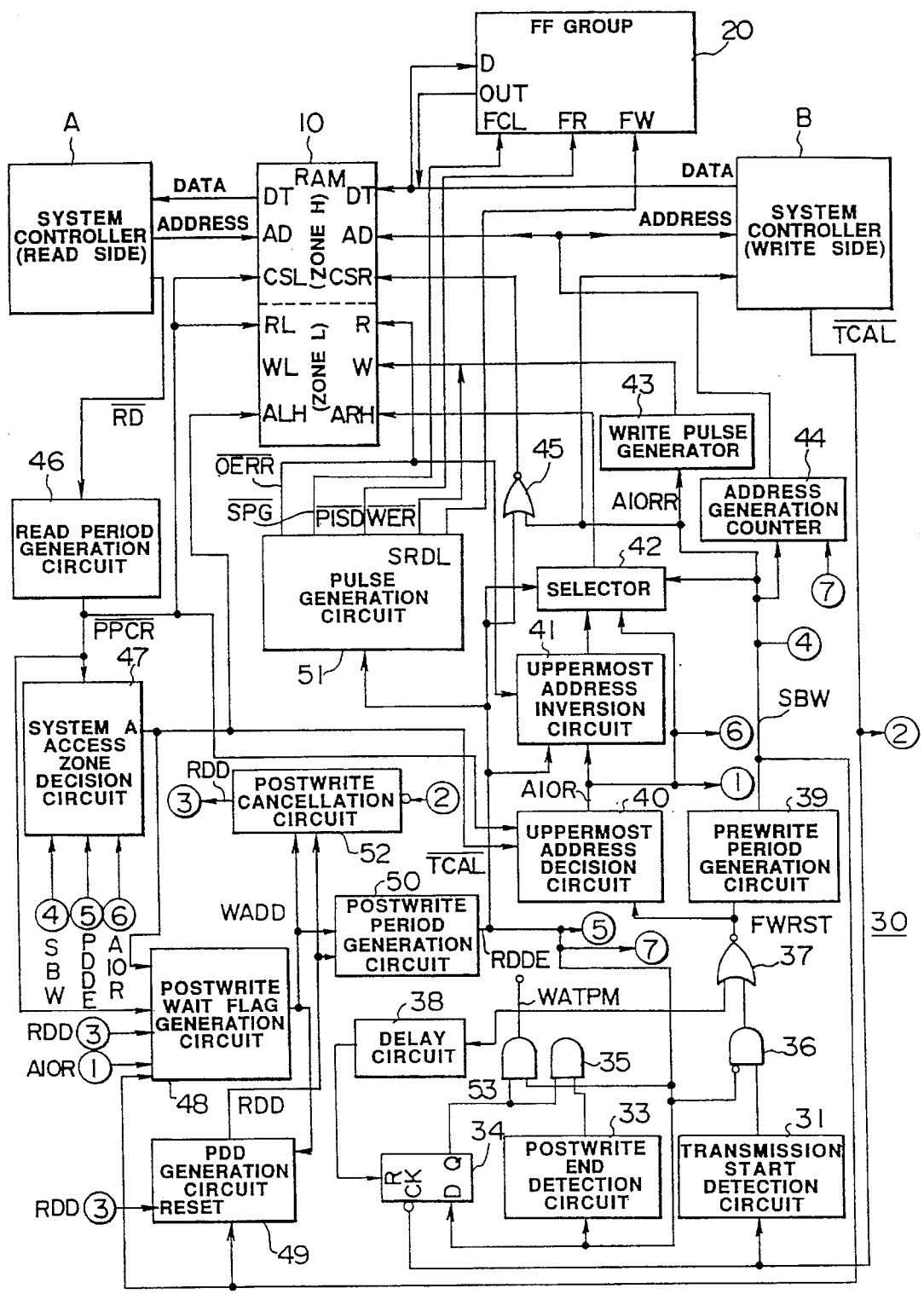
FIG. 19 is a block diagram of a fourth embodiment of the present invention.

The operation when the falling of the signal RD__ and the falling of the signal PPCW3__ take place at the same time is substantially the same as that of FIG. 19, even in which case the memory access zone collision can be avoided.

In this way, with the arrangement of the third embodiment, even when the controllers A and B are operated with different clocks, access collision to the same zone can be suitably avoided. In particular, the collision at the time of starting the prewriting operation can be avoided by the arrangement of the majority decision circuit 39, etc., while the collision at the time of starting the postwriting operation can be avoided by the flip-flops 45 and 46.

FIG. 19 is a fourth embodiment of the present invention. In FIG. 19, the system controllers A and B are installed, for example, in an industrial machine. In the illustrated example, the system controller (which will be abbreviated to the controller, hereinafter) A, which is a master controller for performing general control over the entire industrial machine, has an ordinary commuter configuration including a CPU and a memory. Meanwhile, the system controller B performs data transfer with sensors or actuators installed in various parts of the industrial machine.

The arrangement of FIG. 19 is intended to transmit data from the controller B to the controller A. And it is also assumed that, with respect to the memory access period relationship between the controllers A and B, a access time TA (in the illustrated example, the write time) of the controller A to the memory is set to be longer than the memory non-access period TNB (in the illustrated example, in the non-write period) of the controller B to the memory.

More precisely, the following relationship is assumed to be satisfied.

Figure 20:
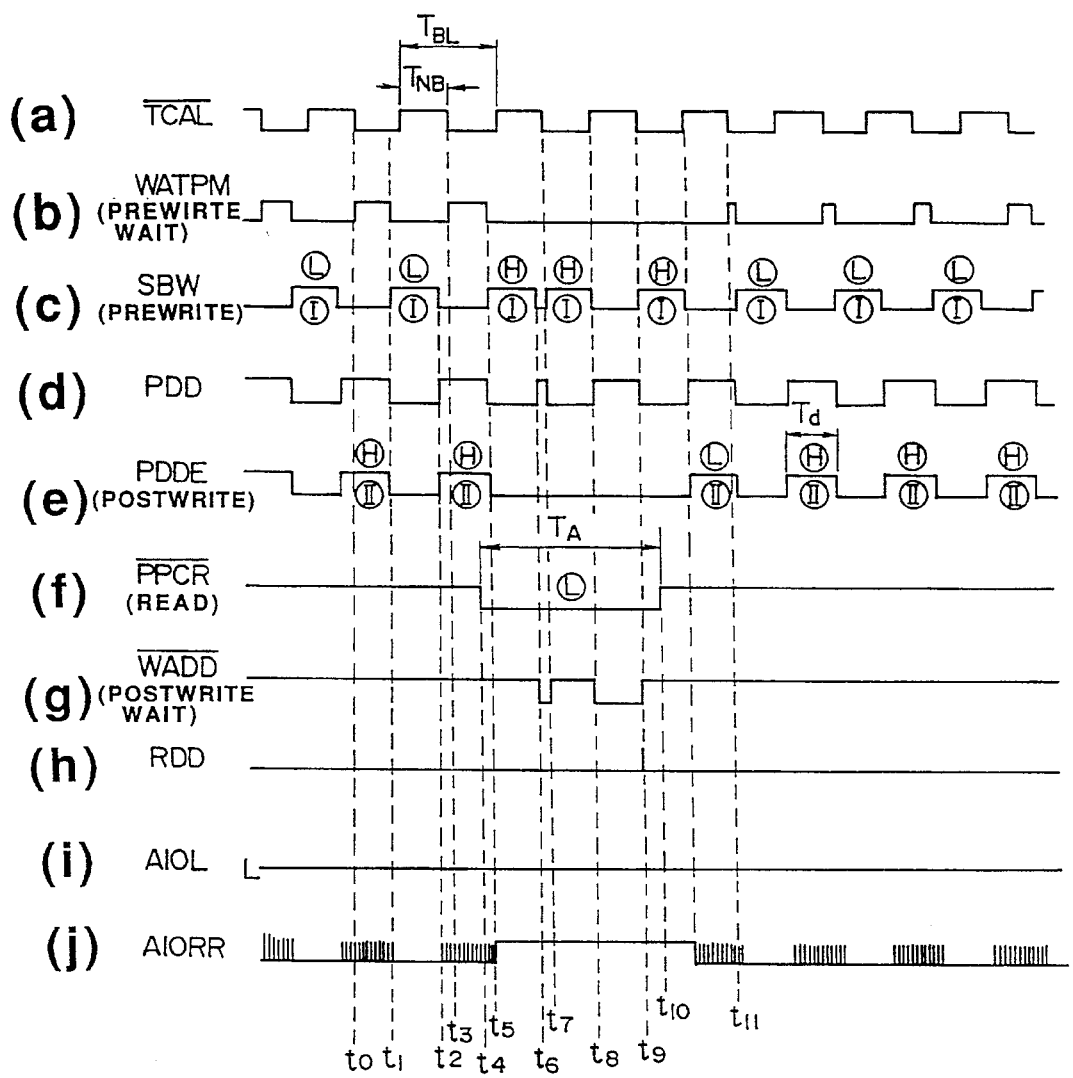
FIGS. 20 to 22 are timing charts showing the operation of a system of the fourth embodiment.

Access time *TA* of system *A*+Time *Td* necessary for postwriting>Non-access time *TNB* of system B (refer to FIG. 20(*a*), (*e*) and (*f*))

The postwriting operation will be explained later.

The memory 10 comprises a dual port memory (DPM) which can be accessed from both of the controllers A and B for its writing/reading operation. In the illustrated example, the memory area of the dual port memory is divided, as shown in FIG. 2, into two zones H and L which are selected by whether the uppermost bit ALH or ARH of an address AD of the dual port memory is H or L. More specifically, when the dual port memory is accessed from the controller A, the uppermost bit ALH is set to be H or L, so that the H or L region is selected; whereas, when the dual port memory is accessed from the controller B, the uppermost bit ARH is set to be H or L, so that the H or L region is selected. That is, in this case, the memory 10 has a so- called duplex structure.

In this case, since data transmission is assumed to be carried out only in one direction from the controller B to the controller A as mentioned earlier, the controller A performs only its reading operation while the controller B performs only its writing operation.

Provided between the controller B and the memory 10 is a buffer circuit 20. The buffer circuit 20 acts as a temporary memory buffer when writing the data read out from one of the zones H and L of the memory 10 into the other zone (that is, the memory-to-memory data transmission from zone H to zone L or from zone L to zone H), after the data from the controller B is written into either one of the zones H and L of the memory 10. The data read out from one zone is once latched in the buffer circuit and immediately output and written in the other zone of the memory 10. In this case, the buffer circuit comprises a multiplicity of flip-flops (which will be referred to as the FF group, hereinafter).

The input/output terminals of the memory 10 and FF group will be explained below.

CSL__: Chip select terminal from the left side (control A) of the memory 10

CSR__: Chip select terminal from the right side (control B) of the memory 10

WL__: Write enable signal of the memory 10 (From the left side)

W__: Write enable signal of the memory 10 (From the right side)

RL__: Read enable signal of the memory 10 (From the left side)

R__: Read enable signal of the memory 10 (From the right side)

ALH: Uppermost address bit of the memory 10 and also refers to a signal for division of the memory 10 into the zones H and L from the left side (controller A)

ARH: Uppermost address bit of the memory 10 and also refers to a signal for division of the memory 10 into the zones H and L from the right side (controller B)

AD: Address terminal

DT: Data terminal

D: Data input terminal of the FF group 20

OUT: Data output terminal of the FF group 20

FCL__: Chip select terminal of the FF group 20

FR__: Read clock input terminal of the FF group 20

FW__: Write clock input terminal of the FF group 20

The system controller B outputs a transmission ready signal TCAL__ in synchronism with the data transmission period and the system controller A outputs the read request signal RD__ in synchronism with the data read (acceptation) period. The write/read control of the memory 10 and FF group 20 is carried out on the basis of these signals TCAL__ AND RD__ so as to carry out the control for inputting the data output from the controller B through the memory 10 to the controller A. This control is carried out by the control logic 30 which comprises a plurality of circuits to be explained below.

More specifically, the plurality of circuits of the control logic 30 form all the logic in the form of hardware such as flip- flops, logical gates, etc.

Prior to explanation of the respective structures of the circuits of the control logic 30, explanation will be briefly made as to the basic logical configuration of the control of the writing/reading operation of the control logic 30 over the memory 10 and FF group 20.

I. First, with respect to the writing/reading operation of the memory 10, the zone L is set to be higher in priority than the zone H.

II. When the data transmission ready signal TCAL__ indicative of a write request is issued from the controller B, two writing operations are basically carried out at different time points shifted in time to the zones H and L of the memory 10, so that the same data of the controller B is written in the zones H and L of the memory 10 (with exception).

III. In the first writing operation (which will be referred to as the prewriting operation, hereinafter), the data is written in either one of the zones H and L of the memory 10. The selection of the zones L and H of the memory 10 is determined by the state of the controller A at the time of starting sending the signal TCAL__ of the controller B. If the controller A is already accessing either one of the zones L and H of the memory 10 for reading operation, writing operation is carried out for the opposite zone; while, if the controller B is not accessing the memory 10, the writing operation is carried out for the zone L having a higher priority.

In the second-time writing operation (which will be referred to as the postwriting operation, hereinafter), after completion of the above prewriting operation, memory-to-memory transmission is carried out from the zone H or L of the memory 10 selected in the prewriting operation to the zone H or L of the memory 10 opposite to the zone selected in the prewriting operation. In other words, in the postwriting operation, the zone H or L of the memory 10 selected in the prewriting operation is put in the readable state, the opposite zone H or L is put in the writable state, the data read out from the readable zone is once latched in the FF group and then written in the writable memory zone.

At the time of starting the postwriting operation, if the controller A is accessing the writable zone (opposite to the memory zone in the prewriting operation), the postwriting operation is awaited until the access of the controller A is completed and immediately after the completion of the access, the postwriting operation is effected (postwriting operation awaited).

IV. In the prewriting operation, if the postwriting operation is being performed at the time of starting sending the signal TCAL_, then the prewriting operation is awaited until the completion of the postwriting operation (postwrite wait period). As soon as the postwriting operation is completed, the state of the controller A is judged and the prewriting operation is immediately started (prewriting operation awaited). The judgment criterion is based on that, if the controller A is accessing either one of the zones H and L of the memory 10, the writing is carried out over the opposite zone; while, if the controller A is not accessing the memory 10, the writing is carried out over the priority zone L.

V. At the time of starting sending the signal TCAL_, if the postwriting operation is awaited, that is, when the controller A is accessing the memory zone to be written in the postwriting operation, the postwriting operation in the wait state is canceled and the next prewriting operation is immediately started over the zone opposite to the zone being accessed by the controller A (the postwriting operation skipped).

VI. When the read signal RD_ is issued from the controller A, the state of the controller B is judged at the time of starting sending the signal RD_. When the controller B is in the prewriting operation, reading operation is carried out over the zone opposite to the zone being subjected to the prewriting operation. When the controller B is in the postwriting operation, reading operation is carried out over the zone (the access zone in the prewriting operation done immediately before the postwriting operation in question) judged as the readable zone in the memory-to-memory transmission. When the controller B is not accessing, reading operation is carried out over the priority zone L.

VII. When it is desired to judge the state of the party controller, for example, the state of the controller B is judged by the rising edge of the system clock CK and the state of the controller A is judged by the falling edge of the system clock CK to thereby prevent the judgment at the same time The logic of the control logic 30 has been briefly explained.

Explanation will next be made as to the structures of the respective circuits of the control logic 30. In FIG. 19, the system clock CK is actually given in various parts but omitted.

The transmission ready signal TCAL_ (FIG. 20(*a*)) of the controller B is input to a transmission start detection circuit 31, etc. The transmission start detection circuit 31 detects the falling of the signal TCAL_ and outputs to a gate 36 a signal which rises to the H state at the falling edge of the signal TCAL_. Also applied to the other input terminal of the gate 36 is an inverted signal of a signal PDDE. The signal PDDE (FIG. 20(*e*)), which is issued from a postwrite period generation circuit 50, indicates an actual postwrite period and has the H state only when the postwriting operation is carried out and otherwise the L state. How to generate the signal PDDE will be detailed later.

Accordingly, a signal issued from the gate 36 has the H state when the postwriting operation is not carried out at the time of the input of the signal TCAL_.

A postwrite end detection circuit 33 detects the falling edge of the signal PDDE and outputs a signal which rises to the H state at the time of completion of the postwriting operation. An output of the detection circuit 33 is input to an AND circuit 35.

A flip-flop 34, when receiving the signal PDDE at its terminal D and an inverted signal of the signal TCAL_ at its clock terminal, latches the signal PDDE at the rising edge of the signal TCAL_. Thus, an output of the flip-flop 34, when the postwriting operation is already carried out at the falling of the signal STCAL_, rises to the H state from that time point and thereafter keeps its state. In other words, the output of the flip-flop 34 is changed to the H state from the time point at which such prewriting operation wait as in the above Paragraph V is started. The output of the flip-flop 34 is input to the gates 35 and 53.

The gate 35 performs an AND operation of the output of the postwrite end detection circuit 33 and the output of the flip-flop 34 and outputs a signal which rises to the H state after the postwriting operation is completed in the aforementioned prewriting operation wait condition and at the time of allowing the start of the prewriting operation. An output of the AND gate 35 is input to an NOR gate 37 and a delay circuit 38. The delay circuit 38 delays the H output of the AND gate by a slight time and then resets the flip-flop 34.

The gate 53 performs an AND operation of the output of the flip-flop 34 and the signal PDDE to form a signal WATPM which has the H state during the prewrite wait period (FIG. 20(*b*)).

The NOR gate 37 performs a NOR operation of the output of the gate 36 and the output of the gate 35 and outputs a signal FWRST_ indicative of the start of the prewriting operation. The signal FWRST_ falls down to the L state when the postwriting operation is not carried out at the time of receiving the signal TCAL_ (gate 36) and also when the prewriting operation is started after the prewriting operation wait period (gate 35).

A prewrite period generation circuit 39 rises to the H state at the falling edge of the signal FWRST_, and thereafter outputs a prewrite period signal SBW which holds the H state for a predetermined time previously set for the prewrite period (FIG. 20(*c*)).

A write pulse generator 43 generates a pulse signal for data writing during the H state of the signal SBW and applies the pulse signal to the write enable terminal W_ of the memory 10. The signal SBW is also input to the controller B which outputs its data during the reception of the signal SBW (during the H state of the signal SBW). That is, the signal SBW applied to the controller B acts as a timing signal indicative of the data transmission timing to the controller B. The signal SBW is input to the address generation counter 44 which, when receiving the signal SBW, starts its counting operation and applies its counted output to the address terminal AD of the memory 10. The address generation counter 44, which also receiving the signal PDDE indicative of the postwrite period, is operated even during the H state of the signal PDDE. A count value issued from the counter 44 is also input to the system controller B and used also as an address signal for data transmission.

A read period generation circuit 46 receives the read request signal RD_ issued from the controller A and outputs a read period signal PPCR_ of the controller A (FIG. 20(f)). The signal PPCR_ is kept to be the L state during the reading operation of the controller A. The signal PPCR_ is input to the terminals CSL_ and RL_ of the memory 10. Accordingly, during the L state of the signal PPCR_, the storage data is necessarily read out from either one of the zones H and L of the memory 10. In other words, there is no wait time with respect to the reading operation. The selection of the zone H or L for the reading operation is determined by the signal A10L (FIG. 20(i)) issued from a system A access zone decision circuit 47.

The system A access zone decision circuit 47 receives the signal SBW indicative of the prewrite period of the system B, the signal PDDE indicative of the postwrite period and the output A10R of an uppermost address decision circuit 40. The signal A10R (which output logic will be detailed later) indicates the memory access zone of the controller B in the prewrite period. When the signal A10R is in the H state, the zone H is selected, while, the signal A10R is in the L state, the zone L is selected. In the postwriting operation or memory-to-memory transmission, the same zone as the access zone of the prewriting operation is used as the zone to be read therefrom and the opposite zone as the zone to be written therein. The signal level of the output A10L of the decision circuit 47 is determined in the following manner. When the signal A10L is in the H state, the zone H is selected; while, when the signal A10L is in the L state, the zone L is selected.

(a) If the controller B is not accessing when the signal PPCR_ falls to the L state (the L state of the signal SBW and the L state of the signal ODDE), the priority zone L is selected.

(b) If the controller B is in the prewriting operation when the signal PPCR_ falls to the L state (the H state of the signal SBW), the zone (A10R_) opposite to the memory access zone (A10R) of the prewriting operation is selected.

(c) If the controller B is in the postwriting operation when the signal PPCR_ falls to the L state (the H state of the signal PDDE), the reading zone (A10R) in the postwriting operation is selected.

In this way, the signal A10L is determined the signals SBW, PDDE and A10R at the falling timing of the read period signal PPCR_, and the signal A10L is input to the terminal ALH (uppermost bit in the address) of the memory 10, etc.

The uppermost address decision circuit 40 judges the state of the controller A at the time of starting the prewriting operation on the basis of the states of the signals PPCR_ and A10L at the time of falling of the signal FWRST_ indicative of the start of the prewrite period, and determines the selection of the controller B of either one of the zones of the memory 10 in the prewriting operation on the judgment result.

The true table for the signal A10R is as follows.

TABLE 6

| PPCR | A10L | A10R |
|------|------|------|
| H    |      | L    |
| L    | H    | L    |
| L    | L    | H    |

That is, as mentioned above, the zone L of the memory 10 is set to be higher in priority than the zone H. For this reason, when the signal PPCR_ is in the H state at the time of starting the prewriting operation, i.e., when the controller A is in the non- access state, the signal A10R is in the L state ho select the priority zone L of the memory 10; whereas, when the signal PPCR_ is in the L state at the time of starting the prewriting operation, i.e., when the controller A is in the access state, the signal A10R is opposite to the signal A10L to select the zone opposite to the zone being accessed by the controller A.

An uppermost address inversion circuit 41 outputs alternately repetitively inverted and non-inverted outputs of the uppermost address signal during the postwrite period (the H state of the signal PDDE) for the aforementioned memory-to-memory transmission (postwrite) to provide one inversion/non-inversion for one period of a signal OERR_ issued from a pulse generation circuit 51. The signal OERR_ is a read clock signal to be applied to the read enable terminal R_ of the memory 10.

A selector 42 selects the output A10R of the uppermost address decision circuit 40 when the signal SBW is in the H state (in the prewriting operation) and selects the inverted/non-inverted output of the uppermost address signal issued from the uppermost address inversion circuit 41 when the signal PDDE is in the H state (in the postwriting operation). A signal A10RR (FIG. 20(j)) issued from the selector is input to the terminal ARH for selection of the zones H and L of the memory 10.

A postwrite wait flag generation circuit 48 receives the signals PPCR_, A10L, A10R, SBW and RDD, and outputs a postwrite wait flag WADD_ (FIG. 20(g)) which has the L state from the end of the prewriting operation until the start of the postwriting operation, i.e., only during postwrite wait period. More specifically, the WADD_ generation circuit 48 causes the signal WADD_ to fall to the L state in the case where the controller A is accessing the memory 10 (the state L of the signal PPCR_) at the time of the end of the prewriting operation (when the signal SBW falls to the L state) and that the access zone of the controller A coincides with the writing zone in the postwriting operation (A10L= A10R). And when the signal RDD_A is input from a postwrite cancellation circuit 52 to the WADD_ generation circuit 48 (postwrite skipped) or when the signal PPCR_ rises to the H state (when the accessing of the controller A is completed), the signal WADD_ in the L state rises to the H state.

A PDD generation circuit 49 generates the signal PDD (FIG. 20(d)) which has the H state from the end of the prewriting operation until the end of the postwriting operation forming a pair with the prewriting operation. When the prewriting operation and the postwriting operation forming a pair therewith are canceled, the signal PDD falls to the L state at the time of starting the next prewriting operation. In other words, the signal PDD is used to judge the end timing of the postwriting operation, and a timer circuit having a predetermined period necessary for the postwriting operation previously set therein is incorporated in the PDD generation circuit 49.

That is, the timer circuit starts its time measuring operation at the end timing of the prewriting operation (the falling timing of the signal SBW to the L state) when no wait is present for the postwriting operation (the H state of the signal WADD__), and thereafter the timer is reset when the preset predetermined time is measured. In this case, the H period of the signal PDD corresponds to the time measuring period.

However, the timer circuit, when the prewriting operation is completed and the postwriting operation is waiting for (the L state of the signal WADD__), starts its time measuring operation from the rising (completion of postwrite wait period) of the signal WADD__, and thereafter is reset at the time of having measured the set time. In this case, the H period of the signal PDD does not correspond to the time measuring period. That is, in this case, the signal PDD rises to the H state at the same time with the completion of the prewriting operation (when the signal SBW falls to the L state), and thereafter keeps the H state during the postwrite wait period (the L state of the signal WADD__) and during the postwrite period (time measuring period).

In the case where the postwriting operation is awaited after the completion of the prewriting operation, however, when the signal WADD__ does not rise after the rising of the signal PDD (when the signal SBW falls to the L state), the state of the signal PDD is prescribed not by the timer value of the timer circuit but by the signal RDD received from the postwrite cancellation circuit 52. That is, this is the case where the postwriting operation is canceled during the wait state of the postwriting operation. Thus, the signal PDD rises to the H state by the falling of the signal SBW and thereafter the H state of the signal PDD falls to the L state by the input of the signal RDD.

The postwrite cancellation circuit 52 comprises and AND gate (WADD EPDD) for performing an AND operation of an inverted signal of the signal WADD__ and the signal PDD, a flip-flop for latching the output of the AND gate at the falling of the transmission ready signal TCAL__. The circuit 52 outputs a postwrite cancellation signal RDD (FIG. 20(h)) which rises to the H state during the postwrite wait period (the L state of the signal WADD__ and the H state of the signal PDD) when the controller B gets ready for the transmission. The signal RDD is input to the postwrite wait flag generation circuit 48 and the PDD generation circuit 49.

The postwrite period generation circuit 50 comprises an AND gate (WADD__EPDD) for performing an AND operation of the signals WADD__ and PDD and a flip-flop. The circuit 50 generates and outputs the postwrite period signal PDDE which has the L state only during the actual postwriting operation of the AND gate based on the AND logic.

A gate 45 performs a NOR operation of the signals SBW and PDDE and inputs its NORed output to the chip select terminal CSR__ of the memory 10. That is, the gate 45 causes the terminal CSR__ to have the L state in the prewriting operation (SBW) and in the postwriting operation (PDDE), at which time chip selection is carried out from the right side of the memory 10.

The pulse generation circuit 51 generates various sorts of pulse signals which are necessary for the postwriting operation (memory-to-memory transmission) during the H state of the signal PDDE.

A signal OERR__ (FIG. 22(d)) is a read pulse signal for the memory 10 which signal is input to the read terminal R__ of the memory 10 and to the uppermost address inversion circuit 41. A signal SPG__ (FIG. 22(f)) is used as a chip select signal of the FF group 20 and is in the L state during the postwrite period. The signal SPG__ is input to the chip select terminal FCL__ of the FF group 20. A signal PISD__ (FIG. 22(e)), which is a read pulse signal for reading out the data from the FF group 20, is input to the read clock terminal FR__ of the FF group 20. A signal WER__ (FIG. 22(g)), which is a write pulse signal for causing the memory 10 to perform the memory-to-memory transmission, is input to the write enable terminal W__ of the memory 10. A signal SRDL__ (FIG. 22(b)), which is a write pulse signal for writing the data from the memory 10 in the FF group 20, is input to the write clock terminal FW__ of the Ff group 20.

Figure 21:
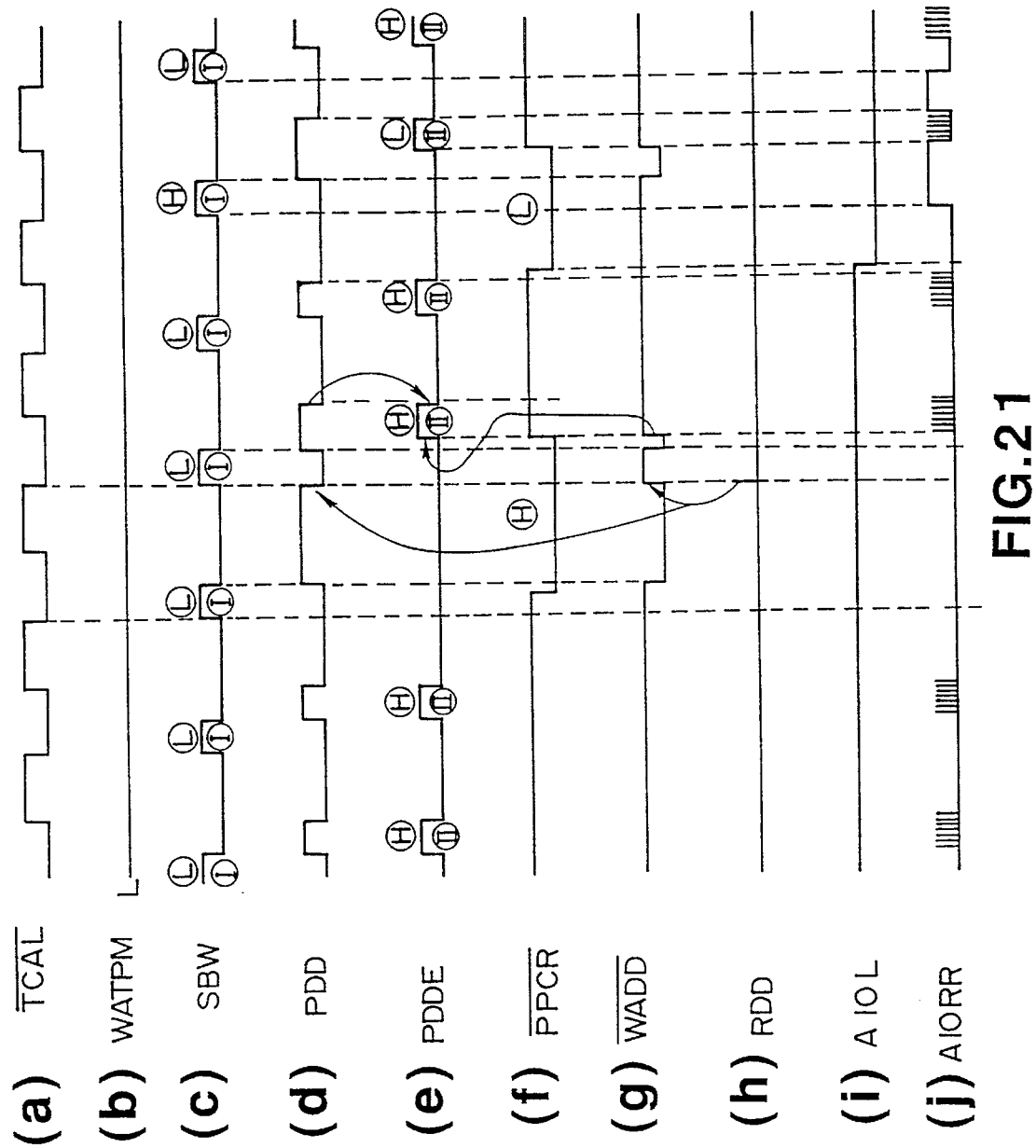

The arrangement of the control logic 30 has been explained above. Explanation will next be made as to the operation of the control logic by referring to timing charts of FIGS. 20 to 22. In FIG. 20 and 21, symbols H and L given above the respective signals denote the selected memory arrangement, symbols I and U denote the prewriting and postwriting operations respectively.

At a time t0 in FIG. 20, the signal TCAL__ of the controller B falls to the L state. At the time t0, since the signal PDDE is in the H state (in the postwriting operation), the outputs of the gates 36 and 35 are in the L state and the prewrite start signal FWRST__ is not output. In other words, since no postwriting operation is carried out in a period from the time t0 to a time t1 at which the signal PDDE changed to the L state), the prewrite wait period is reached (the signal WATPM is in the H state).

Figure 22:
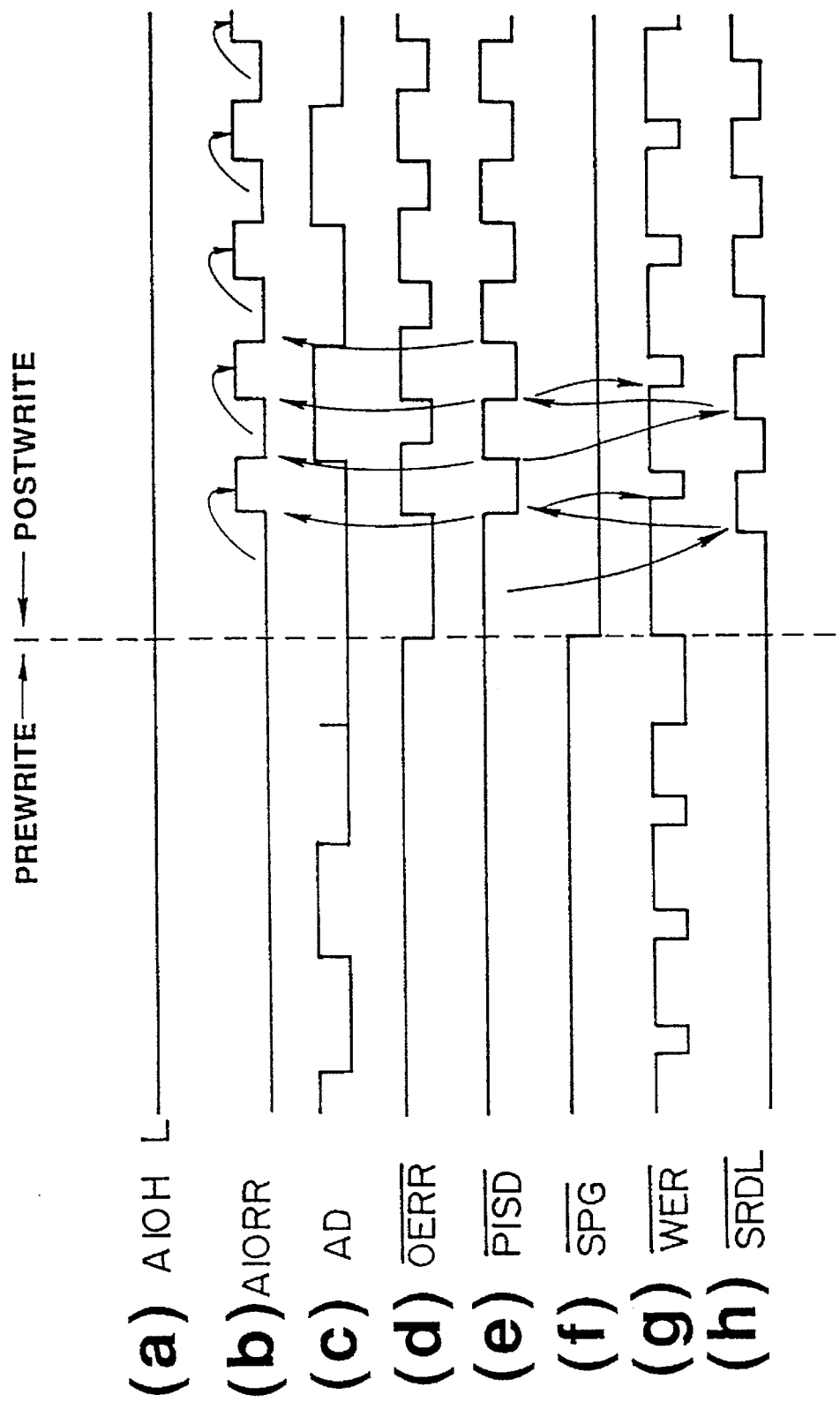

In the postwriting operation, as shown in FIG. 22, the uppermost address bit ARH is inverted/non-inverted by the uppermost address inversion circuit 41 in synchronism with a read clock signal OERR__ (FIG. 22(b)), an address signal indicative of the bits other than the uppermost bit is output from the pulse generation circuit 51, such various sorts of signals as shown in FIG. 22 are output from the pulse generation circuit 51, so that the memory- to-memory transmission is carried out through the FF group 20. Symbol AD in FIG. 22(c) denotes the lowermost bit of the address signal issued from the address generation counter 44. In FIG. 22, the memory-to-memory transmission is carried out from the zone L to zone H of the memory 10.

At the time t1 in FIG. 20, the signal PDDE falls to the L state, whereby the postwriting operation is completed. The postwrite end detection circuit 33 detects the end of the postwriting operation and outputs a signal which rises to the H state. Since the flip-flop 34 keeps the H state of the signal PDDE from the time t0, the output of the gate 35 rises to the H state at the time t1. The output having the H state issued from the gate 35 is input through the gate 37 to the prewrite period generation circuit 39 and the uppermost address decision circuit 40. Accordingly, the prewrite period signal SBW rises to the H state at the time t1 and the H state is kept only for the preset time.

On the other hand, the uppermost address decision circuit 40 judges the state of the party controller A at the time t1 and decides the memory zone to be selected by its own controller B in the prewriting operation. In this case, at the time t1, its own controller B is not accessing the memory 10 at the time t1 (the H state of the signal PPCR__), the signal A10R is changed to the L state to select the priority zone L. The signal A10R is applied through the selector 42 to the terminal ARH of the memory 10. The H input of the signal SBW causes the write pulse generator 43 and the address generation counter 44 to be operated so that, during the H period of the signal SBW, the write pulse is input to the terminal W of the memory 10 and the address signal is input the terminal AD of 10 and to the controller B. Accordingly, the controller B transmits the data during the H state of the signal SBW. As a result, in a period between the time t1 and t2, the data from the controller B is written in the zone L of the memory 10, whereby the prewriting operation is executed.

At the time t2, the prewriting operation is completed and the signal SBW falls to the L state. The falling of the signal SBW causes the PDD generation circuit 49 to make the signal PDD to rise to the H state. Since the party controller A is not accessing at the time t2, the postwrite wait flag signal AWDD_ is not output. Therefore, no postwrite wait takes place and the signal PDDE immediately rises to the H state at the time t2. The rising of the signal PDDE causes operation of the uppermost address inversion circuit 41, pulse generation circuit 51 and address generation counter 44, whereby the aforementioned postwriting operation is executed. This postwriting operation is continued until a time t5 at which the time measuring operation of the timer circuit in the PDD generation circuit 49 is completed. In the postwriting operation, since the prewriting operation forming a pair with the postwriting operation is carried out over the zone L, the zone H is used to be written therein and the zone L is used to be read out therefrom.

At a time t3 in the middle of the postwriting operation, the transmission ready signal TCAL_ is input from the controller B. However, the postwriting operation is being carried out, the prewrite wait state is continued from the time t3.

At a time t4 in the middle of the postwriting operation, a read request is generated from the controller A (the L state of the signal PPCR_). The read period generation circuit 46 causes the signal PPCR_ to keep the L state for a time duration from the time t4 to a time t10. The signal PPCR_ is input to the terminals CSL_ and R_ of the memory 10 so that the memory 10 is put in its readable state for the duration between the time t4 to t10. The system A access zone decision circuit 47 judges the state of the party controller B by the falling time point (time t4) of the signal PPCR_ and decides the memory zone to be accessed by its own controller A. In this case, since the zone H of the memory 10 is in its writable state and its the postwriting operation is being executed at the time t4, the decision circuit 47 causes the signal A10L to be changed to the L state so that the controller A can select the zone L opposite to the zone H. As a result, for the duration between the time t4 and t10, the data of the zone L of the memory 10 is read out and output to the controller A.

At a time t5 during the access period of the controller A, the postwriting operation is completed and the signal PDDE falls to the L state. As a result, as in the above, the gate 35 has the H state at the time t5, whereby the prewrite start signal FWRST_ is output at the time t5. This causes the aforementioned prewriting operation to be executed for a time from the time t5 to a time t6 at which the time set in the prewrite period generation circuit 39 expires. In this case, since the controller A is already accessing the zone L, the prewriting operation is carried out over the zone H.

At the time t6, the prewriting operation is completed over the zone H and the signal SBW falls to the L state. Since the controller A is already accessing the zone L to be subjected to the postwriting operation at the time t6, the output flag signal WADD_ of the postwrite wait flag generation circuit 48 falls to the L state and the output PDD of the PDD generation circuit 49 rises, thus starting the postwrite wait.

At a time t7, the transmission ready signal TCAL_A of the controller B falls to the L state. The postwrite cancellation circuit 52 latches the ANDed output between the inverted signal of the signal WADD_ and the signal PDD, i.e., the H state by the falling of the signal TCAL_, converts the latched signal into a momentary rising signal, and outputs it as the signal RDD. The input of the signal RDD to the postwrite wait flag generation circuit 48 causes the signal WADD_ to rise to the H state and the signal PDd to fall to the L state at the time t7, whereby the postwrite wait period ends.

At the time t7, the output of the gate 36 rises to the H state (since the signal PDDE is in the L state). The H output of the gate 36 causes the output FWRST_ of the gate 37 to fall to the L state, whereby the prewriting operation is started from the time t7.

In other words, at the time t7, at which the transmission ready signal TCAL_ is input from the controller B, the postwriting operation is in its wait period. For this reason, the postwriting operation is canceled and the next prewriting operation is started from the time t7 (postwriting operation skipped).

Since the controller A is accessing the zone L in the prewrite period between the time t7 and t7, the writing operation is carried out over the zone H.

At the time t8, the prewriting operation over the zone H is completed and the signal SBW falls to the L state. Since the controller A is already accessing the zone L to be subjected to the postwriting operation even at the time t8, postwrite wait again occurs. The postwrite wait is continued until a time t9 at which the signal TCAL_ falls again to the L state.

At the time t9, the postwriting operation is again canceled and the next prewriting operation is carried out from the time t9. Since the access of the controller A is already completed at a time t10 after the time t9, the prewriting and postwriting operations having the prewrite wait (not having the postwrite wait and the postwrite skip) are repeated thereafter (from a time t11 on).

FIG. 21 shows another example where the timing between the signals TCAL_ and PPCR_ is different from that in FIG. 20. The basic operation of FIG. 21 is substantially the same as that of FIG. 20 and thus explanation thereof is omitted. In the example of FIG. 21, the prewrite wait (WATPM) is not present.

Although the FF group 20 has been used as the buffer means between the controller B and the memory 10 in the above embodiment, the FF group 20 may be replaced by a first-in-first-out circuit (FIFO) or the like. In the latter case, the prewriting and postwriting techniques alone are somewhat different (the memory-to-memory transmission is not carried out) from those in FIG. 19, but the other postwrite skipping and prewrite wait techniques are the same as in FIG. 19.

More specifically, when the FIFOs are employed, an FIFO for address storage and an FIFO for data storage are provided so that data is written in either one of the zones H and L of the memory 10 and the data and address are written in the FIFOs, in the prewriting operation; while, the data and address already written in the FIFOs in the above prewriting operation are read out from the FIFOs after completion of the above prewriting operation and the read-out data is written in the zone H or L opposite to the zone selected in the above prewriting operation on the basis of the output address of the FIFO, in the prewriting operation.

In the foregoing embodiment, when the postwriting operation is still carried out at the time of the input of the transmission ready signal STCAL_ from the controller B, the prewriting operation is carried out after the completion of the postwriting operation (prewrite wait), in which case the following technique may be used.

That is, in such a case, the postwriting operation being executed is forcibly terminated at the time of the input of the transmission ready signal TCAL_ and the data from the controller B is written in the memory zone which has been so far written by the forcibly-terminated postwriting operation, that is, the prewriting operation is immediately executed. Under such control, since the memory zone which postwriting operation has been forcibly terminated is rewritten by the latest data of the controller B through the prewriting operation, it is mixed up with data of the different accessing operations during the rewriting operation. However, the prewriting operation is carried out over the memory zone having the mixed data with the signal SBW having the H state, so that, even when the PDDE generation circuit is reset, the controller A cannot access the memory zone having the mixed data. Thus, there is no such danger that the data of the controller B in the different accessing operations are sent to the controller A.

Figure 23:
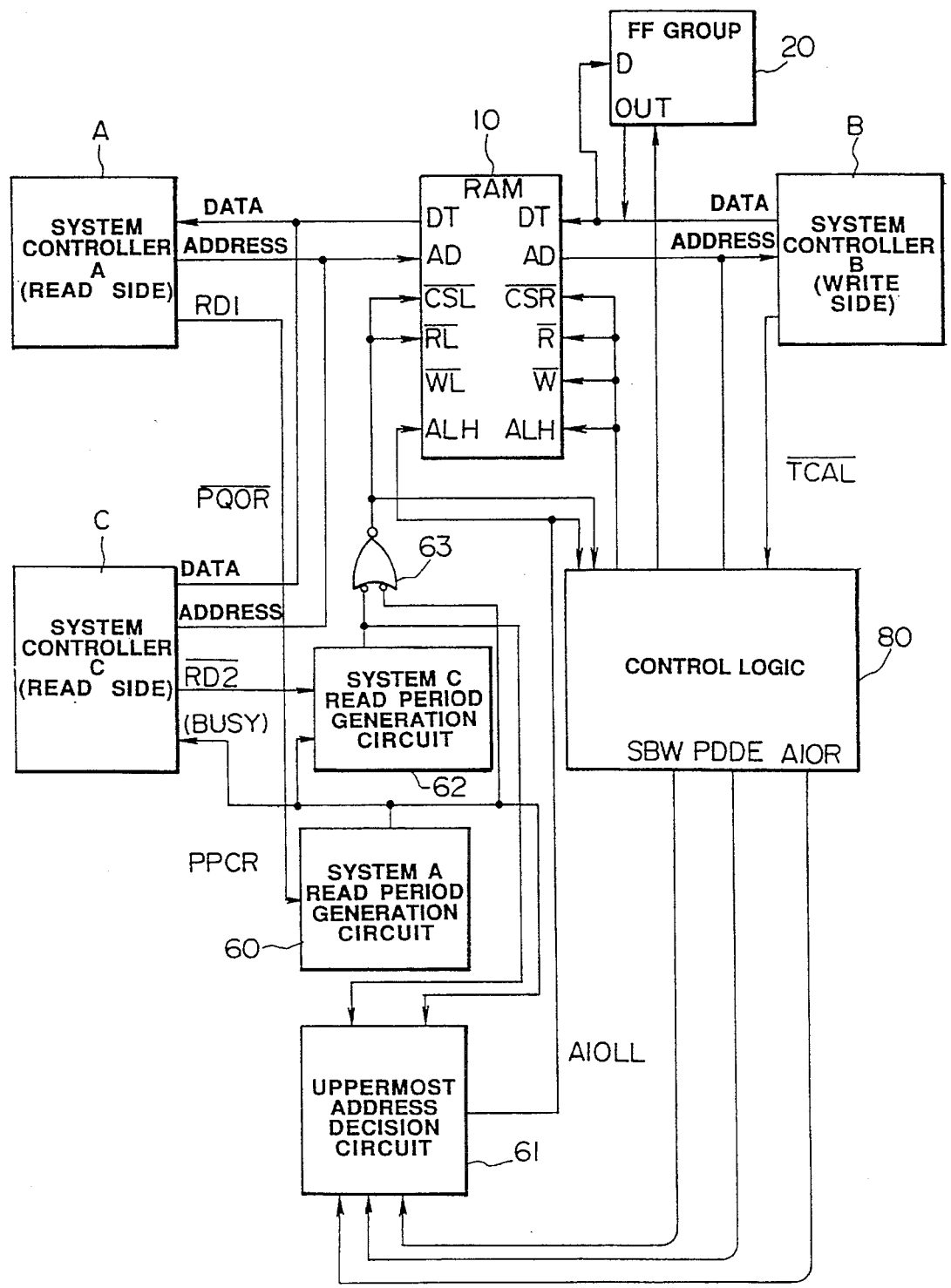
FIG. 23 is a block diagram of a modified form of the fourth embodiment.

Shown in FIG. 23 is a modification example of a system of the present invention, in which data transmission is carried out from a system controller B to two system controllers A and C. In the system of FIG. 23, such a filed net is intended that the data of the controller B varying with time is processed by the controller A and also monitored by the controller C.

In the arrangement of FIG. 23, the structures of the memory 10 and FF group 20 are exactly the same as those in FIG. 19; a control logic 80 corresponds to the control logic 30 in FIG. 19 but the system A zone decision circuit 47 and read period generation circuit 46 removed; and the other circuits are the same as those in FIG. 19.

In more detail, with the arrangement of FIG. 23, the left-side terminals (ports) of the dual port memory 10 are commonly used to the controllers A and C, whereby attaining reduction in the circuit scale. For the purpose of realizing the shared left-side ports, an access request RD1_ from the controller A is set to be higher in priority than an access request RD2_ from the controller C.

A system A read period generation circuit 60 receives the read request signal RD1_ from the controller A and outputs a read period signal PPCR_ for the controller A, which operation is substantially the same as that of the read period generation circuit 46 in FIG. 19.

Figure 24A:
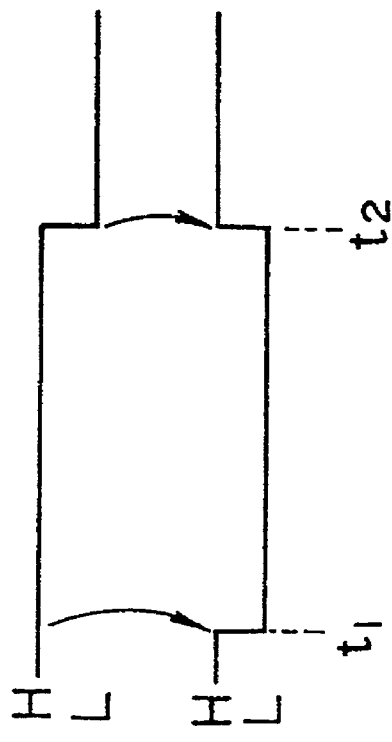
FIGS. 24(a) and 24(b) are timing charts for explaining the operation of the modified form.

A system C read period generation circuit 62 generates and outputs a read period signal PQCR_ for the controller C on the basis of the read request signal RD2_ from the controller C. However, the generation circuit 62 is designed, when the signal PPCR_ falls to the L state during the L state of the signal PQCR_ and even during the accessing operation of the controller C to the memory 10, to forcibly make the signal PQCR_ to rise to the H state to thereby interrupt the accessing operation of the controller C (FIG. 24(a), time t2).

The output signals PPCR_ AND PQCR_ of the read period generation circuits 60 and 62 are input via a NOR gate 63 to the terminals CSL_ and R_ of the memory 10.

Figure 24B:
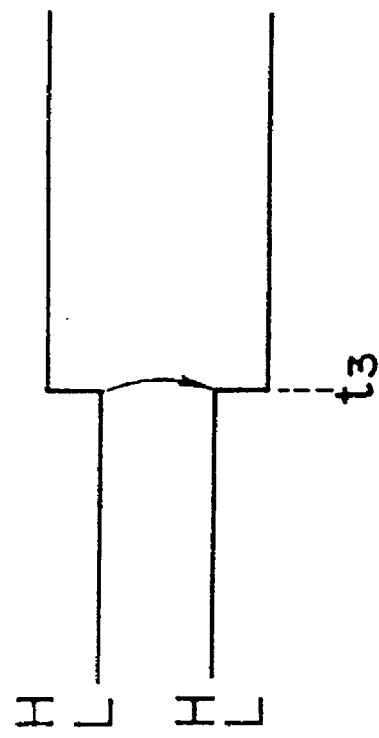

The signal PPCR_ is also input to the controller C. Accordingly, the controller C can transmit the read request signal RD1 when the signal PPCR_ is not in the L state or by confirming the rising of the signal PPCR_ (FIG. 24(a), time t1; FIG. 24(b), time t2).

An uppermost address decision circuit 61 receives, in addition to these signals PPCR_ and PQCR_, the signals SBW, PDDE and A10R from the control logic 80. Thus, the logic of the decision circuit 61 is basically the same as the aforesaid logic of the system A access zone decision circuit 47 in FIG. 19, except that the circuit 61 also receives the read period signal PQCR_ of the controller C. Thus, the decision circuit 47, on the basis of the three signals received from the control logic 80 when the signals PPCR_ and PQCR_ fall to the L state, decides a signal A10LL in such a manner that the controller A or C can access the zone not written by the controller B, and applies the signal A10LL to the terminal ALH of the memory 10.

In the control logic 80, a circuit (not shown) corresponding to the uppermost address decision circuit 40 in FIG. 19, receives the output of the gate 63 and the signal A10LL in place of the signals PPCR_ and A10L. This circuit decides the memory access zone in the prewriting operation on the basis of these input signals. In the control logic 80, also a circuit corresponding to the postwrite wait flag generation circuit 48 in FIG. 19 receives the output of the gate 63 in place of the signal PPCR_.

In this way, in accordance with the embodiment of FIG. 23, the left-side ports of the memory 10 are commonly used to the controllers A and C and when the controller A is not using the memory 10, the controller C can access the memory 10. As a result, a bus use efficiency by the controllers A and C can be increased and a circuit scale can be reduced.

Although explanation has been made in connection with the case where data transmission is carried out between the two system controllers in the foregoing embodiments other than the embodiment of FIG. 23, these embodiments may be applied also to star-type and tree-type networks. When the present invention is applied to such a network having a master station and a plurality of slave stations as mentioned in the latter case, the dual port memory 10 and the control circuit 20 are provided for each of the slave stations.

INDUSTRIAL APPLICABILITY:

The present invention may be suitably applied to data transmission between two controllers or between one controller and a multiplicity of controllers.

I claim:

1. An asynchronous data transmission system for asynchronously transmitting data from a first system controller to a second system controller wherein first and second memories for writing therein output data of said first system controller and for reading out the written data to said second system controller are provided, said first system controller performing its data writing operation to said first and second memories during a predetermined period, and said second system controller performing its data reading operation from said first and second memories at a period different from the writing period of said first system controller, said system comprising:

first control means for controlling the data writing operation of the first system controller so that the output data of the first system controller is alternately written into said first and second memories in response to data transmission of said first system controller to said second system controller;

second control means, at the time when said first system controller is about to perform the writing operating, if said second system controller is performing the reading operation over one of said first and second memories, for allowing said first system controller to immediately write the output data of said first system controller into the other memory opposite to said one of said first and second memories over which said second system controller is performing the reading operation;

identification storage means for identifying which of said first and second memories is used during the writing operation of said first system controller and for updating and storing identification data each time the writing operation of said first system controller is performed;

third control means, at the time when said second system controller is about to receive data, if said first system controller is not performing the writing operation, for selecting one of said first and second memories over which the data writing operation was just performed based on the data stored in said identification storage means and allowing said second system controller to immediately read out data from the selected memory; and fourth control means, at the time when said second system controller is about to perform the reading operation, if said first system controller is performing the writing operation, for allowing said second system controller to immediately read out the data from the other memory opposite to said one of said first and second memories over which said first system controller is performing the writing operation.

2. An asynchronous data transmission system as set forth in claim 1, wherein said second control means determines to which of the first and second memories the data is written when a system clock signal increases, and wherein said third and fourth system control means determine from which one of the first and second memories the data is to be read when the system clock signal decreases.

3. An asynchronous data transmission system for transmitting data from a first system controller to a second system controller comprising:

a first readable/writable memory for temporarily storing therein output data of said first system controller;

a second memory for writing therein the output data of said first system controller or data temporarily stored in said first memory and for reading out the written data therefrom to said second system controller;

a third memory provided in parallel to said second memory for writing therein the output data of said first system controller or the temporarily stored data of said first memory and for reading out therefrom the written data to said second system controller;

write control means for performing a first write control function of simultaneously writing the output data of said first system controller into both one of said second and third memories and into said first memory in response to one write period of said first system controller and for performing, after completion of the first write control function, a second write control function of writing the data written in said first memory into the other memory opposite to said one of said second and third memories in which the output data of said first system controller is written during the first write control function; and read control means for reading out the data from either one of said second and third memories and for outputting the read-out data to said second system controller in response to one read period of said second system controller.

4. An asynchronous data transmission system as set forth in claim 3, wherein predetermined priorities of said second and third memories are previously set for accesses from said first and second system controllers, wherein said write control means includes:

first judgment means for determining an access state of said second system controller to said second and third memories at the time of starting a write request from said first system controller;

first selection means for selecting one of said second and third memories which said second system controller is not accessing on the basis of an output of said first judgment means and said priorities;

first write means for performing said first write control of simultaneously writing output data of said first system controller both into the memory corresponding to a selection result of said first selection means and into said first memory in response to the write request from said first system controller;

second judgment means for determining an access state of said second system controller to said second and third memories at the time of completion of said first write control; and second write means for performing said second write control of writing the storage data of said first memory into the other memory which is not selected by said first selection means in response to a judgement result of said second judgment means, and wherein said read control means includes:

third judgment means for determining a write access state from said first system controller or said first memory to said second and third memories at the time of starting a read request from said second system controller;

second selection means for selecting one of said second and third memories which said first system controller is not accessing on the basis of an output of said third judgment means and said priorities; and read means for reading out the storage data from the memory corresponding to a selection result of said second selection means and for outputting the read-out data to said second system controller in response to the read request from said second system controller.

5. An asynchronous data transmission system as set forth in claim 4, wherein said second write means further includes wait means responsive to said second judgment means when said second judgement means determines that said second system controller is accessing one of said second and third memories into which the storage data of said first memory is to be written for keeping said second write control waiting until said second system controller is no longer accessing said one of said second and third memories.

6. An asynchronous data transmission system as set forth in claim 4, wherein said first judgement times a different period from that timed by second judgement means.

7. An asynchronous data transmission system as set forth in claim 3, wherein said second control means determines to which of the first and second memories the data is written when a system clock signal increases, and wherein said third and fourth system control means determine from which one of the first and second memories the data is to be read when the system clock signal decreases.

8. An asynchronous data transmission system for transmitting data from a first system controller to a second system controller wherein different system clocks are used for data transmission between said first and second system controllers, said system comprising:

a first readable/writable memory for temporarily storing therein output data of said first system controller;

second and third memories for setting therein predetermined access priorities of said first and second system controllers thereto, for writing therein the output of said first system controller or the temporary storage data of said first memory, and for reading out the written data therefrom to said second system controller;

first judgment means responsive to said first system controller, for determining an access state of said second system controller to said second and third memory for at least three times so as to obtain at least three different results;

majority decision means for performing majority decision between the judgment results of said first means;

first selection means for selecting one of said second and third memories which is not being accessed by said second system controller on the basis of an output of said majority decision means;

first write means, in response to a write request from said first system controller, for performing first write control of simultaneously writing the output data of said first system controller both into the memory corresponding to a selection result of said first selection means and into said first memory;

second judgment means for determining an access state of said second system controller to said second and third memories for at least two times at different time points in response to completion of said first write control;

second write means for performing second write control of writing the storage data of said first memory into the other memory which is not selected by said first selection means in response to a judgment result of said second judgment means;

third judgment means for determining a write access state from the first system controller or said first memory to said second and third memories at the time of starting a read request from said second system controller;

second selection means for selecting one of the second and third memories which said first system controller is not accessing on the basis of an output of said third judgment means and said priorities; and read means, in response to the read request from said second system controller, for reading out the storage data from the memory corresponding to a selection result of said second selection means and for outputting the read-out data to said second system controller.

9. An asynchronous data transmission system as set forth in claim 8, wherein said second write means further includes wait means responsive to said second judgment means when said second judgement means determines that said second system controller is accessing one of said second and third memories into which the storage data of said first memory is to be written for keeping said second write control waiting until said second system controller is no longer accessing said one of said second and third memories.

10. An asynchronous data transmission system for transmitting data from a first system controller to a second system controller, said system comprising:

a first memory for writing therein output data of said first system controller and for reading out the written data therefrom to said second system controller;

a second memory provided in parallel to said first memory for writing therein the output data of said first system controller and for reading out written data therefrom to said second system controller;

buffer means for performing buffering operation of writing the storage data of one of said first and second memories into the other one of said first and second memories;

write control means for performing first-time write control of writing the output data of said first system controller into one of said first and second memories in response to data transmission request of said first system controller and, after completion of the first-time write control, for performing second-time write control of reading out the data written in said first-time write control and writing the read-out data into the other memory opposite to said one of said first and second memories in which the data is written in the first-time write control; and read control means for reading out the data from either one of said first and second memories and for outputting the read-out data to said second system controller in response to a read request of said second system controller.

11. An asynchronous data transmission system as set forth in claim 10, wherein predetermined priorities of said first and second memories are previously set for accesses from said first and second system controllers, wherein said write control means includes:
first judgment means for determining an access state of said second system controller to said first and second memories at the time of completing said first-time write control and for judging whether said second-time write control is to be started or awaited;

first write means, when said first judgment means outputs a judgment result that the second-time write control is to be started, for executing the second-time write control;

first wait means, when said first judgment means outputs a judgment result that the second-time write control is to be delayed, for delaying operation of the second-time write control until the access of said second system controller is completed;

second judgment means for determining the access state of said second system controller to said first and second memories and an output of said first judgment means at the time of starting the transfer request from said first system controller;

second write means, when said second judgment means determines that said second system controller is in its non-access state, for performing said first-time write control by selecting one of said first and second memories which is higher in said priorities;

third write means, when said second judgment means determines that the second-time write control is in its waiting state, for canceling the second-time write control and performing the first-time write control over one of said first and second memories which the second system controller is not accessing; and second wait means, when said second judgment means determines that the second-time write control is being executed, for delaying operation of the first-time write control until completion of the second-time write control, and wherein said read control means includes:
third judgment means for determining the states of said first-time and second-time write controls at the time of starting the read request from said second system controller; and read means, on the basis of an output of said third judgment means and said priorities, when said first system controller is in the non-access state, for reading out the storage data from one of said first and second memories which is higher in said priorities, when said first-time write control is being carried out, reading out the storage data from the other memory opposite to said one of said first and second memories over which the first-time write control is being carried out and, when said second-time write control is being, carried out, reading out the storage data from one of said first and second memories over which the reading operation is carried out in the second-time write control, and for outputting the read-out data to the second system controller.

12. An asynchronous data transmission system for transmitting data from a first system controller to a second system controller said system comprising:

a first readable/writable memory for temporarily storing therein output data of said first system controller;

a second memory for writing therein the output data of said first system controller or the data temporarily stored in said first memory and for reading out the written data therefrom to said second system controller;

a third memory provided in parallel to said second memory for writing therein the output data of said first system controller or data temporarily stored in said first memory and for reading out therefrom the written data to said second system controller;

write control means for performing first-time write control of simultaneously writing the output data of said first system controller both into one of said second and third memories and into said first memory in response to a data transmission request of said first system controller and for performing, after completion of said first-time write control, second-time write control of writing the data written in said first memory into the other memory opposite to said one of said second and third memories in which the output data of said first system controller is written in the first-time write control; and read control means for reading out the data from either one of said second and third memories and for outputting the read-out data to said second system controller in response to a read request of said second system controller.

13. An asynchronous data transmission system for transmitting data from a first system controller to second and third system controllers, said system comprising:

a first memory for writing therein output data of said first system controller and for reading out the written data therefrom to said second and third system controllers;

a second memory provided in parallel to said first memory for writing therein the output data of said first system controller and for reading out the written data therefrom to said second and third system controllers:

buffer means for performing buffering operation of writing the storage data of one of said first and second memories into the other one of said first and second memories;

write control means for performing first-time write control of writing the output data of said first system controller into one of said first and second memories in response to a data transmission request of said first system controller and for performing second-time write control for reading out the data written in the first-time write control after completion of the first-time write control and writing the read-out data into the other memory opposite to said one of said first and second memories in which the data is written in the first-time write control; and read control means, in response to a read request from said second and third system controllers, for reading out the data from either one of said first and second memories of which priority is previously set and for outputting the read-out data to said second or third system controllers.

* * * * *